(12) United States Patent
Shaikh et al.

(10) Patent No.: US 8,946,361 B2
(45) Date of Patent: Feb. 3, 2015

(54) POLYISOBUTYLENE PREPARED AT HIGH VELOCITY AND CIRCULATION RATE

(71) Applicant: TPC Group LLC, Houston, TX (US)

(72) Inventors: Sohel K. Shaikh, Dhahran (SA); Alfred Chiu, Kingwood, TX (US); Patrick L. Bradley, Kingwood, TX (US); Gilbert D. Valdez, Pearland, TX (US); Peggy J. Macatangay, League City, TX (US)

(73) Assignee: TPC Group LLC, Houston, TX (US)

( * ) Notice: Subject to any disclaimer, the term of this patent is extended or adjusted under 35 U.S.C. 154(b) by 0 days.

(21) Appl. No.: 14/346,367

(22) PCT Filed: Oct. 10, 2012

(86) PCT No.: PCT/US2012/059464
§ 371 (c)(1),
(2) Date: Mar. 21, 2014

(87) PCT Pub. No.: WO2013/062758
PCT Pub. Date: May 2, 2013

(65) Prior Publication Data
US 2014/0235801 A1   Aug. 21, 2014

Related U.S. Application Data

(60) Provisional application No. 61/551,526, filed on Oct. 26, 2011.

(51) Int. Cl.
*C08F 2/00* (2006.01)
*C08F 2/02* (2006.01)
*C08F 2/14* (2006.01)
*B01J 8/00* (2006.01)
*C08F 2/01* (2006.01)
*C08F 10/10* (2006.01)
*C08F 110/10* (2006.01)

(52) U.S. Cl.
CPC .................. *C08F 110/10* (2013.01); *B01J 8/00* (2013.01); *C08F 2/01* (2013.01); *C08F 10/10* (2013.01)
USPC .............................. 526/64; 526/88; 526/348.7

(58) Field of Classification Search
USPC ......................................... 526/64, 348.7, 88
See application file for complete search history.

(56) References Cited

U.S. PATENT DOCUMENTS

| | | |
|---|---|---|
| 3,932,371 A | 1/1976 | Powers |
| 4,152,499 A | 5/1979 | Boerzel et al. |
| 4,605,808 A | 8/1986 | Samson |
| 5,068,490 A | 11/1991 | Eaton |
| 5,191,044 A | 3/1993 | Rath et al. |
| 5,286,823 A | 2/1994 | Rath |

(Continued)

FOREIGN PATENT DOCUMENTS

EP    1242464 B1    4/2011

*Primary Examiner* — Fred M Teskin
(74) *Attorney, Agent, or Firm* — Michael W. Ferrell

(57) ABSTRACT

A method of making a polyisobutylene polymer in a recirculating loop reactor with one or more reaction tubes in contact with a heat transfer medium includes controlling the delta P and polymerization reaction to provide a linear velocity of the reaction mixture of at least 11 ft/sec in the one or more tubes of the loop reactor and/or controlling the delta P and polymerization reaction of steps (b) and (c) to provide a recirculation ratio of the recirculation rate to the feed rate of at least 30:1. Typically, the process utilizes a recirculating pump operating at a at a pressure differential of from 35 psi to 70 psi.

20 Claims, 12 Drawing Sheets

(56) References Cited

U.S. PATENT DOCUMENTS

| | | |
|---|---|---|
| 5,408,018 A | 4/1995 | Rath |
| 5,962,604 A | 10/1999 | Rath |
| 6,525,149 B1 | 2/2003 | Baxter, Jr. et al. |
| 6,562,913 B1 | 5/2003 | Baxter, Jr. et al. |
| 6,683,138 B2 | 1/2004 | Baxter, Jr. et al. |
| 6,777,506 B1 | 8/2004 | Baxter, Jr. et al. |
| 6,844,400 B2 | 1/2005 | Baxter, Jr. et al. |
| 6,858,188 B2 | 2/2005 | Baxter, Jr. et al. |
| 6,858,690 B2 | 2/2005 | Webb et al. |
| 6,884,858 B2 | 4/2005 | Baxter, Jr. et al. |
| 6,992,152 B2 | 1/2006 | Lobue et al. |
| 7,037,099 B2 | 5/2006 | Linke et al. |
| 7,038,008 B2 | 5/2006 | Wettling et al. |
| 7,056,990 B2 | 6/2006 | Baxter, Jr. et al. |
| 7,091,285 B2 | 8/2006 | Baxter, Jr. et al. |
| 7,217,773 B2 | 5/2007 | Rath et al. |
| 7,485,764 B2 | 2/2009 | Rath et al. |
| 7,498,396 B2 | 3/2009 | Baxter, Jr. et al. |
| 7,645,847 B2 | 1/2010 | Baxter, Jr. et al. |

FIG. 4

$$Q = \dot{m}\, c_p (t_1 - t_2) = \dot{M}\, C_p (T_1 - T_2) \qquad (1)$$

$$Q = U\, A\, F_t\, \Delta t \qquad (2)$$

$$\Delta t = \frac{(T_1 - t_2) - (T_2 - t_1)}{\ln\left\{\dfrac{(T_1 - t_2)}{(T_2 - t_1)}\right\}} \qquad (3)$$

$$F_t = \frac{\sqrt{R^2 + 1}}{R - 1} \cdot \frac{\ln \dfrac{(1-S)}{(1-RS)}}{\ln \dfrac{2 - S(R + 1 - \sqrt{R^2 + 1})}{2 - S(R + 1 + \sqrt{R^2 + 1})}} \qquad (4)$$

$$R = \frac{(T_1 - T_2)}{(t_2 - t_1)} \; ; \; S = \frac{(t_2 - t_1)}{(T_1 - t_1)} \qquad (5)$$

$$U = Q / (A\, F_t\, \Delta t) \qquad (6)$$

CATALYST FEED AS A FUNCTION OF DELTA P (CIRCULATION RATE);
HIGHLY REACTIVE PIB; NOMINAL Mn of 1000

CONVERSION AS A FUNCTION OF DELTA P (CIRCULATION RATE);
HIGHLY REACTIVE PIB; NOMINAL Mn of 2400

METHANOL MODIFIER FEED AS A FUNCTION OF DELTA P (CIRCULATION RATE);
HIGHLY REACTIVE PIB; NOMINAL Mn of 2400

REACTOR TEMPERATURE AS A FUNCTION OF DELTA P (CIRCULATION RATE);
HIGHLY REACTIVE PIB; NOMINAL Mn of 2400

CONVERSION AS A FUNCTION OF DELTA P (CIRCULATION RATE);
MID RANGE VINYLIDENE PIB; NOMINAL Mn of 3000

CONVERSION AS A FUNCTION OF DELTA P (CIRCULATION RATE);
MID RANGE VINYLIDENE PIB; NOMINAL Mn of 3300

POLYISOBUTYLENE PREPARED AT HIGH VELOCITY AND CIRCULATION RATE

CROSS-REFERENCE TO RELATED APPLICATION

This application is based upon International Application Serial No. PCT/US2012/059464, filed Oct. 10, 2012, which was, in turn, based upon U.S. Provisional Application Ser. No. 61/551,526, filed Oct. 26, 2011. The priorities of International Application Serial No. PCT/US12/59464 and Provisional Application Ser. No. 61/551,526 are hereby claimed and their disclosures incorporated by reference into this application in its their entirety.

TECHNICAL FIELD

The present invention relates to the manufacture of polyisobutylene by way of cationic polymerization, characterized by high velocity as well as elevated circulation rates and turbulence in a loop reactor operated with relatively high pressure drop across a recirculating pump. Unexpected improvement is seen in heat transfer, monomer conversion, catalyst utilization and product characteristics as discussed hereinafter.

BACKGROUND OF INVENTION

Processes for cationically polymerizing olefins are known in the art. U.S. Pat. No. 6,858,690 to Webb et al. discloses a method of making butyl rubber wherein processing efficiency including heat transfer is improved by utilizing a tertiary halogen initiator. See, also, U.S. Pat. No. 3,932,371 to Powers which discloses polymerization of copolymers of isoolefins and conjugated dienes in a two-phase system where propane is used as a diluent in order to improve heat transfer.

The polymerization of olefins using Friedel-Crafts type catalysts, such as boron trifluoride and aluminum trichloride is well known. The degree of polymerization of the products obtained varies according to which of the various known polymerization techniques is used and also varies with the parameters used to control the reaction. The molecular weight of the polymeric product is directly related to the degree of polymerization and that the degree of polymerization may be manipulated by manipulating process parameters so as to produce a variety of products having respective desired average molecular weights. Due to the nature and mechanics of the olefinic polymerization process, a polyolefin product has a single double bond remaining in each molecule at the end of the polymerization process. The position of this remaining double bond is often an important feature of the product. For example, polyisobutylene (PIB) molecules wherein the remaining double bond is in a terminal (vinylidene) position are known to be more reactive than PIB molecules wherein the remaining double bond is internal, that is, not in a terminal position. A PIB product wherein most of the double bonds are in a terminal position may often be referred to as high vinylidene or reactive PIB. The extent to which a polyolefin product has terminal double bonds may also be manipulated by manipulation of process parameters.

It is also known that alpha olefins, particularly PIB, may be manufactured in at least two different classes of material— regular and high vinylidene. Conventionally, these two product grades have been made by different processes, but both often and commonly use a diluted feedstock in which the isobutylene concentration may range from 40 to as high as 90% by weight. Non-reactive hydrocarbons, such as isobutane, n-butane and/or other lower alkanes commonly present in petroleum fractions, may also be included in the feedstock as diluents. The feedstock often may also contain small quantities of other unsaturated hydrocarbons such as 1-butene and 2-butene.

High vinylidene, or highly reactive PIB, a relatively new product in the marketplace, is characterized by a large percentage of terminal double bonds, typically greater than 70% and preferentially greater than 80%. This provides a more reactive product, compared to regular PIB, and hence this product is also referred to as highly reactive PIB. The terms highly reactive (HR-PIB) and high vinylidene (HV-PIB) are synonymous. The basic processes for producing HR-PIB all include a reactor system, employing $BF_3$ and/or modified $BF_3$ catalysts, such that the reaction time can be closely controlled and the catalyst can be immediately neutralized once the desired product has been formed. Since formation of the terminal double bond is kinetically favored, short reactions times favor high vinylidene levels. The reaction is quenched, usually with an aqueous base solution, such as, for example, $NH_4OH$, before significant isomerization to internal double bonds can take place. Molecular weights are relatively low. HR-PIB having an average molecular weight of about 950-1050 is the most common product. Conversions, based on isobutylene, are kept at 75-85%, since attempting to drive the reaction to higher conversions reduces the vinylidene content through isomerization. Prior U.S. Pat. No. 4,152,499 dated May 1, 1979, prior U.S. Pat. No. 4,605,808 dated Aug. 12, 1986, prior U.S. Pat. No. 5,068,490 dated Nov. 26, 1991, prior U.S. Pat. No. 5,191,044 dated Mar. 2, 1993, prior U.S. Pat. No. 5,286,823 dated Jun. 22, 1992, prior U.S. Pat. No. 5,408,018 dated Apr. 18, 1995 and prior U.S. Pat. No. 5,962,604 dated Oct. 5, 1999 are all directed to related subject matter.

Other than the HR grades and the regular grades of PIB, a certain grade of PIB known as the enhanced grade has been more recently developed (EP 1381637 and related patents discussed below). The advantage of these series of products is that the overall reactivity is high without the need for high vinylidene content.

The present invention is directed, in part, to controlling the reaction in a loop reactor by manipulating the tube velocity and recirculation rate of the process fluid. The invention is particularly concerned with polymerization of isobutylene and includes significant improvements to existing technology in terms of conversion, product attributes and so forth discussed in more detail below.

U.S. Pat. No. 6,844,400 shows an apparatus for polymerizing isobutylene wherein the recirculation rate is specified in the range of 20:1 to 50:1 and notes that higher recirculation ratios increase the degree of mixing, leading to narrower polymer distributions. Col. 9, lines 37-59. The '400 patent teaches to use two reactors in order to increase the conversion and to use lower flow rates to increase the residence time. Col. 11, line 57 to Col. 12, line 11. Related patents include U.S. Pat. Nos. 6,777,506 and 6,858,188. These patents all teach to increase residence time in order to increase conversion and lower polydispersity. See, also, U.S. Pat. No. 7,038,008 which discloses recirculation rates of 1000:1 to 1:1. See Col. 3, lines 55-64.

In U.S. Pat. No. 7,645,847 it is noted a Reynolds Number of at least 2000 is desirable in a tube and shell reactor for making isobutylene. Col. 8, lines 26-36, as well as a recirculation rate of from 20:1 to 50:1, Col. 5, lines 54-64. Single reactor conversion rates are disclosed at 51% in Table 6 for a residence time of 58 seconds. The '847 patent mentions:

The molar ratio of $BF_3$ to complexing agent in the catalyst composition may generally be within the range of from approximately 0.5:1 to approximately 5:1, desirably within the range of from approximately 0.5:1 to approximately 2:1, and preferably within the range of from approximately 0.5:1 to approximately 1:1. Ideally, the catalyst composition may simply be a 1:1 complex of $BF_3$ and methanol. In some preferred embodiments of the invention, the molar ratio of $BF_3$ to complexing agent in said complex may be approximately 0.75:1. Col. 10, lines 14-23
and that:
Generally speaking, for PIB production the amount of the $BF_3$ catalyst introduced into the reaction zone should be within the range of from about 0.1 to about 10 millimoles for each mole of isobutylene introduced into the reaction zone. Preferably, the $BF_3$ catalyst may be introduced at a rate of about 0.5 to about 2 millimoles per mole of isobutylene introduced in the feedstock. Col. 10, lines 36-43.

Conversion levels are conventionally inversely related to α-vinylidene content. Col. 14, lines 35-47. See, also, U.S. Pat. No. 6,992,152 which notes temperatures of at least 0° C. up to 60° F. or higher. Note U.S. Pat. No. 6,884,858, Example 2, where the reaction temperature is maintained at 90° F. Process parameters appear in Table 4 of the '858 patent, Col. 15, including a Reynolds Number reported at 3180 and a recirculation rate of 50/1.7 or 29.4. Related patents include U.S. Pat. No. 6,525,149; U.S. Pat. Nos. 6,683,138; and 6,562,913.

The following patents describe mid-range vinylidene content polyisobutylene (PIB) polymers and processes for producing them: U.S. Pat. Nos. 7,037,099; 7,091,285; 7,056,990; and 7,498,396. The products are characterized in that at least about 90% of the PIB molecules present in the product comprise alpha or beta position isomers. The vinylidene (alpha) isomer content of the product may range from 20% to 70% thereof and the content of tetra-substituted internal double bonds is very low, preferably less than about 10% or 5% and ideally less than about 1-2%. The midrange vinylidene content PIB polymer products are prepared by a liquid phase polymerization process conducted in a loop reactor at a temperature of at least 60° F. using a $BF_3$/methanol catalyst complex and a contact time of no more than 4 minutes. Otherwise, processing is similar to the other patents noted above.

Prior art systems are typically characterized by linear velocity in reactor tubes of less than 10 ft/sec as is seen in European Patent No. EP 1 242 464. Note particularly Table 4 where a linear velocity of 9.3 ft/sec is specified as well as Tables 6 and 8 where linear velocities of 6.59 ft/sec appear.

SUMMARY OF INVENTION

Despite numerous advances in the art, there is a need to provide more energy efficient and higher yield processes which provide superior material having lower polydispersity, even with higher molecular weight.

There is provided in one aspect of the invention a method of making a polyisobutylene polymer in a recirculating loop reactor with one or more reaction tubes in contact with a heat transfer medium comprising: (a) feeding isobutylene, catalyst and optionally other feed components to a residual reactor stream at a feed rate to form a reaction mixture; (b) recirculating the reaction mixture in the one or more reaction tubes of the loop reactor at a recirculation rate greater than the feed rate utilizing a recirculating pump operating at a pressure differential, delta P, corresponding to a recirculating flow; and (c) polymerizing the reaction mixture in the one or more tubes of the loop reactor to convert isobutylene to polyisobutylene polymer at a conversion rate expressed in %, w/w, while cooling the one or more tubes of the loop reactor with the heat transfer medium. During the process, a salient feature is (d) controlling the recirculation rate, the delta P and polymerization reaction of steps (b) and (c) to provide a linear velocity of the reaction mixture of at least 11 ft/sec in the one or more tubes of the loop reactor with the proviso that if the conversion of isobutylene is less than 55%, the recirculation rate, the delta P and the polymerization reaction of steps (b) and (c) are controlled to provide a linear velocity of the reaction mixture in the one or more reaction tubes of at least 13.5 ft/sec.

In various embodiments, the delta P and polymerization reaction are controlled to provide a linear velocity of the reaction mixture of from 11 ft/sec to 20 ft/sec in the one or more reaction tubes of the loop reactor; for example, wherein the delta P and polymerization reaction are controlled to provide a linear velocity of the reaction mixture of at least 12 ft/sec, 13 ft/sec, 14 ft/sec or 15 ft/sec in the one or more reaction tubes of the loop reactor.

In yet other cases, the method is practiced with the further proviso that if the conversion rate of isobutylene is less than 55%, the pressure delta and the polymerization of the reaction mixture in the one or more reaction tubes is at least 14 ft/sec or at least 15 ft/sec.

In another aspect, the pressure differential, delta P, of the recirculating pump is suitably from 35 psi to 70 psi and the process includes controlling the recirculation rate, pressure delta and polymerization reaction of steps (b) and (c) to provide a recirculation ratio of the recirculation rate to the feed rate of at least 30:1.

It was unexpectedly found that conversion increases with increased recirculation rates at the same residence time, contrary to the teachings of the prior art. In this regard, note FIG. 1, wherein it is seen that conversion dramatically increases from 65% or so up to more than 75% as the recirculation rate and tube velocity are increased. Higher yield is realized without significant additional capital or processing costs. It was also found that polydispersity decreases with substantially the same residence time as circulation rates increase.

In connection with the inventive process, products produced have unexpectedly lower polydispersities especially at higher molecular weight, also contrary to the teachings of the prior art. This feature is particularly desirable when the products are used for making derivatives such as alkyl phenols and/or fuel or lubricating oil additives. Moreover, relatively low polydispersities can be maintained, even when less diluent is used. Note, for example, Table 4, where molecular weight increases, while polydispersity and alpha vinylidene content remain relatively constant as the pressure drop and velocity increase and the isobutene diluent level is reduced from 10 wt. % to about 3.5 wt. %. A low diluent process uses less material and is very desirable from an economic perspective as well as an environmental perspective, since solvent does not need to be recycled or disposed of Reducing diluents levels while maintaining desired product attributes is enabled by employing high velocity in accordance with the invention.

A still further unexpected result is that alpha content does not decrease with increasing conversion. The prior art also teaches away in this regard.

Conventional boron trifluoride catalyst systems reported in the patent literature typically produce somewhat less than 900 lbs PIB/lb of $BF_3$ and typically less than 450 lbs PIB/lb of $BF_3$. Much higher production by catalyst is seen in accordance with the present invention; typically from 2 to 4 times more production per pound of $BF_3$ as discussed hereinafter in connection with the following U.S. Pat. Nos. 7,485,764; 7,217,773; and 7,038,008. Catalyst usage decreases substantially as the linear velocity of the reaction mixture is increased as is seen in FIG. 2. Catalyst turnover number increases from below 1500 lbs polymer/lb catalyst complex to over 2000 lbs polymer/lb catalyst complex as velocity is increased from 9 ft/sec to 14 or 15 ft/sec. Lower fluoride use is also highly desirable in terms of cost reduction and environmental impact.

Still further features and advantages of the invention will become apparent from the discussion which follows.

BRIEF DESCRIPTION OF DRAWINGS

The invention is described in detail below with reference to the various Figures, wherein:

FIG. 4 lists equations useful for determining heat transfer and the overall heat transfer coefficient;

DETAILED DESCRIPTION OF INVENTION

Figure 1:
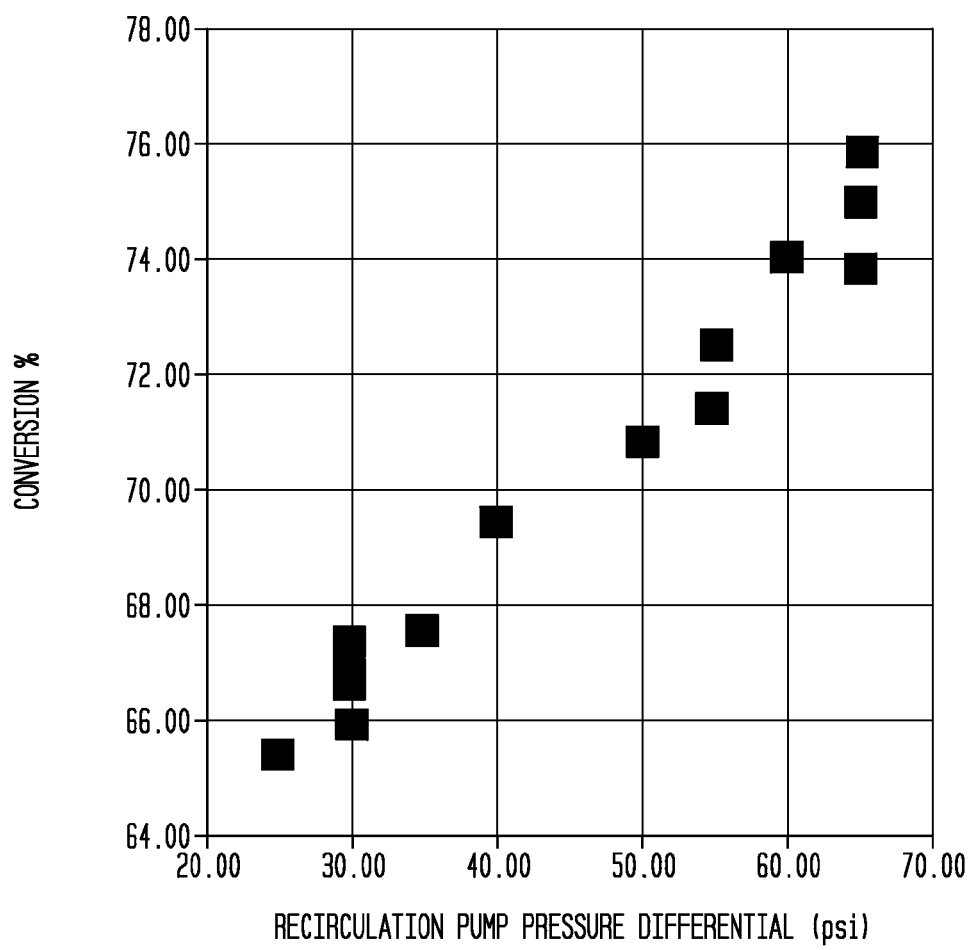
FIG. 1 is a plot of isobutylene conversion to polymer as a function of pressure differential across a recirculating pump in a loop reactor.

The invention is described in detail below with reference to several embodiments and numerous examples. Such discussion is for purposes of illustration only. Modifications to examples within the spirit and scope of the present invention, set forth in the appended claims, will be readily apparent to one of skill in the art. Terminology used throughout the specification and claims herein is given its ordinary meaning, for example, psi refers to pressure in lbs/inch and so forth. Terminology is further defined below.

The improved process of the present invention features the use of a Friedel-Crafts catalyst which is complexed with a complexing agent. Many useful Friedel-Crafts catalysts are known to those of ordinary skill in the related art field. In particular, many useful catalysts are described in the patents referenced above. Useful Friedel-Crafts catalysts include, for example, $BF_3$, $AlCl_3$, $TiCl_4$, $BCl_3$, $SnCl_4$ and $FeCl_3$ and the like. The complexing agent for the catalyst, and in particular for the $BF_3$ catalyst, may be any compound containing a lone pair of electrons, such as, for example, an alcohol, an ester or an amine. For purposes of the present invention, however, the complexing agent may be an alcohol, desirably a primary alcohol, preferably a C1-C8 primary alcohol (such as, for example, methanol, ethanol, propanol, isopropanol, hexyl alcohol and the like) and ideally methanol. The molar ratio of $BF_3$ to complexing agent in the catalyst composition is generally in the range of from approximately 0.5:1 to approximately 5:1 respectively, desirably within the range of from approximately 0.5:1 to approximately 2:1, and preferably within the range of from approximately 0.5:1 to approximately 1:1. Ideally, the catalyst composition may simply be a 1:1 complex of $BF_3$ and methanol as is seen in the examples. For purposes of convenience, "catalyst" refers to a Friedel-Crafts catalyst of the class described above, while "catalyst complex" refers to the Friedel-Crafts catalyst and complexing agent up to a 1:1 molar ratio. When complexing agent is used in a molar excess with respect to the Friedel-Crafts catalyst it is referred to herein as modifier.

"Catalyst complex turnover number" and like terminology refers to the weight of polymer produced per unit weight of catalyst complex employed in the process.

"Consisting essentially of" and like terminology refers to the recited components and excludes other ingredients which would substantially change the basic and novel characteristics of the mixture or composition. Unless otherwise indicated or readily apparent, a composition or mixture consists essentially of the recited components when the composition or mixture includes 95% or more by weight of the recited components. That is, the terminology excludes more than 5% unrecited components.

Conversion of the reaction mixture to polymer is expressed in weight percent and calculated as the weight of polymer produced less the weight of isobutylene fed to the reaction system divided by the weight of isobutylene fed to the reaction system times 100%.

Polyisobutylene, "PIB" and like terminology refers to polymers made up of repeat units derived from isobutene, also referred to as isobutylene.

Such polymers are derived from feedstocks made up of purified isobutenes and hydrocarbon diluents, from isobutene concentrate, dehydro effluent, or from raffinate streams. The PIB polymer consists essentially of repeat units derived from isobutylene, but may contain minor amounts of material derived from 1-butenes, butadiene or other $C_4$ olefins, 2-butenes (cis and/or trans) depending on the feedstock composition. Typically, the polymer is more than 99% by weight derived from isobutylene monomer. Particular compositions of interest in connection with the present invention have a number average molecular weight of from 500 to 4000 Daltons and in preferred embodiments significant amounts of alpha vinylidene terminated molecules:

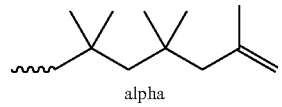
alpha

Highly reactive (HR) PIB polymer compositions typically include more than 80 mole % alpha molecules, while mid-range vinylidene content PIB products contain less alpha and more beta olefin isomers (1,1,2-trisubstituted or 1,2,2-trisubstituted cis or trans isomer):

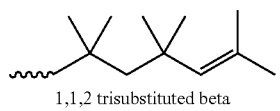

1,1,2 trisubstituted beta

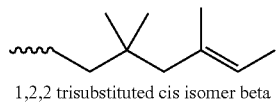

1,2,2 trisubstituted cis isomer beta

Other structures which may be present include tetrasubstituted structures, other trisubstituted structures with a double bond in the internal gamma position, structures with other internal double bonds and aliphatic structures, for example:

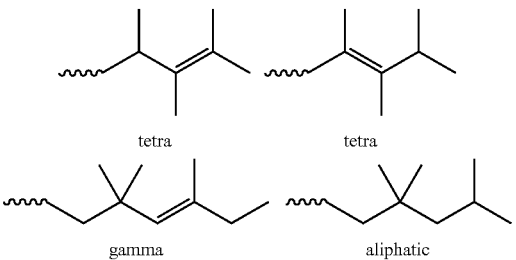

When calculating endgroup percentages, all PIB molecules found in the PIB compositions having a significant presence (more than half a percent or so) are included in endgroup calculations. The endgroup content is determined by nuclear magnetic resonance $^{13}$C NMR as is well known in the art.

Suitable feedstocks include purified isobutenes with or without hydrocarbon diluents such as isobutane, hexane and so forth. Purified isobutene is readily available in bulk with purity levels of more than 95% by weight, for example 98.5%+ by weight or 99.5% by weight in some cases. The purified isobutene may be fed with diluents as seen in the examples herein. Other suitable feedstocks include isobutene concentrate, dehydro effluent, or raffinate having typical compositions noted in Tables 1-3 below.

TABLE 1

| Isobutylene Concentrate | |
|---|---|
| Ingredient | Weight % |
| C$_3$ component | 0.00 |
| I-butane | 6.41 |
| n-butane | 1.68 |
| 1-butene | 1.30 |
| I-butene | 89.19 |
| trans-2-butene | 0.83 |
| cis-2-butene | 0.38 |
| 1,3-butadiene | 0.21 |

TABLE 2

| Dehydro Effluent | |
|---|---|
| Ingredient | Weight % |
| C$_3$ components | 0.38 |
| I-butane | 43.07 |

TABLE 2-continued

| Dehydro Effluent | |
|---|---|
| Ingredient | Weight % |
| n-butane | 1.29 |
| 1-butene | 0.81 |
| I-butene | 52.58 |
| trans-2-butene | 0.98 |
| cis-2-butene | 0.69 |
| 1,3-butadiene | 0.20 |

TABLE 3

| Raff-1 | |
|---|---|
| Ingredient | Weight % |
| C$_3$ components | 0.357 |
| I-butane | 4.42 |
| n-butane | 16.15 |
| 1-butene | 37.22 |
| I-butene | 30.01 |
| trans-2-butene | 8.38 |
| cis-2-butene | 2.27 |
| 1,3-butadiene | 0.37 |
| Other | 0.61 |

One of skill in the art will appreciate that the feedstock may need to be purified to remove water and oxygenates such as alcohols, ethers and so forth to avoid adverse effects on the catalyst. Typical media for removal of impurities from hydrocarbon feed streams use molecular sieves, activated alumina and other hybrid adsorbents. A suitable absorbent to reduce water and oxygenate levels to desired limits is UOP AZ 300 (Des Plaines, Ill., USA). Post treatment, prior to feeding to the reactor, the feed stream preferably has less than 3 ppm of oxygenates and less than 1 ppm of water.

A mid-range vinylidene polymer composition refers to a PIB wherein a first portion of the PIB molecules have alpha position double bonds and a second portion of the molecules have beta position double bonds, wherein said first and second portions together include at least 80 mole % of the PIB molecules of the composition, wherein said first portion includes less than 75 mole % of the PIB molecules of the composition, and wherein no more than 10 mole % of the PIB molecules of the composition have tetra-substituted double bonds, the first and second portions together includes at least 85 mole % of the PIB molecules of the composition and preferably the said first and second portions together include at least 90 mole % of the PIB molecules of the compositions. Typically, the first portion includes less than 72.5 mole % of the PIB molecules of the composition and sometimes less than 70 mole % of the PIB molecules of the composition. In preferred cases, no more than 5 mole % of the PIB molecules of the composition have tetra-substituted double bonds.

"Highly reactive PIB" and like terminology means polyisobutylene polymers with more than 80 mole percent alpha vinylidene terminated molecules.

Kinematic viscosity of the PIB products of the invention is expressed in Cst @100° C. and is preferably measured in accordance with Test Method ASTM D 445.

Molecular weight herein is typically reported as number average molecular weight, in Daltons, and is measured by gel permeation chromatography (GPC). GPC measurements reported herein were carried out using a Viscotek GPCmax® instrument (Malvern instruments, Worcestershire, UK) employing a 3-column set-up (5 μm (particle size) 100 Angstrom (pore size), 5 nm 500 Angstrom, 5 nm $10^4$ Angstrom)

and a Refractive Index (RI) detector. Polyisobutylene standards were used to construct the calibration curve.

Polydispersity or PDI is defined as the ratio of the weight average molecular weight divided by the number average molecular weight of the polymer.

"Linear velocity" refers to the velocity of the recirculating reaction mixture in the tubes of the loop reactor and is calculated by dividing the volumetric flow rate of the reaction fluid by the cross-sectional area of the reaction tubes.

Recirculation ratio is calculated as the weight ratio of the reaction mixture recirculated to the feed added to the residual reactor stream.

Residence time is calculated as the volume of the reactor divided by the volumetric feed rate.

Any standard test method referred to herein is the version in effect as of Jan. 1, 2011.

With the process of the invention, there are seen dramatic increases in conversion and improved product quality. Without being bound by any particular theory, it is believed that improved heat transfer and mixing, in part, provide the benefits observed. The heat transfer coefficient of the process fluid was increased by increasing the pressure differential across a recirculating pump thereby increasing the velocity of the process fluid in the reactor tubes, likely decreasing the amount of relatively immobile material adjacent the reactor walls. In other words, by increasing the degree of turbulence of the tube side process fluid, the effect of undesirable boundary layer heat and mass transfer phenomena are reduced. The heat transfer is related to the Nusselt number of a fluid. Further, equations such as the Sieder Tate equations (for turbulent flow) provide a way to calculate the Nusselt number. These correlations relate the Nusselt number to the Reynolds number (ratio of inertial to viscous forces) and the Prandtl number (ratio of viscous diffusion to thermal diffusion). A potential problem faced in loop reactors is that there may be an increase in the viscosity of the tube side fluid at the heat transfer surface. This leads to a substantially lower internal heat transfer coefficient and a loss in conversion and productivity. It is seen in the examples which follow that the heat transfer coefficient increases dramatically and unexpectedly as the velocity in the tubes is increased above conventional levels.

EXAMPLES

Figure 3:
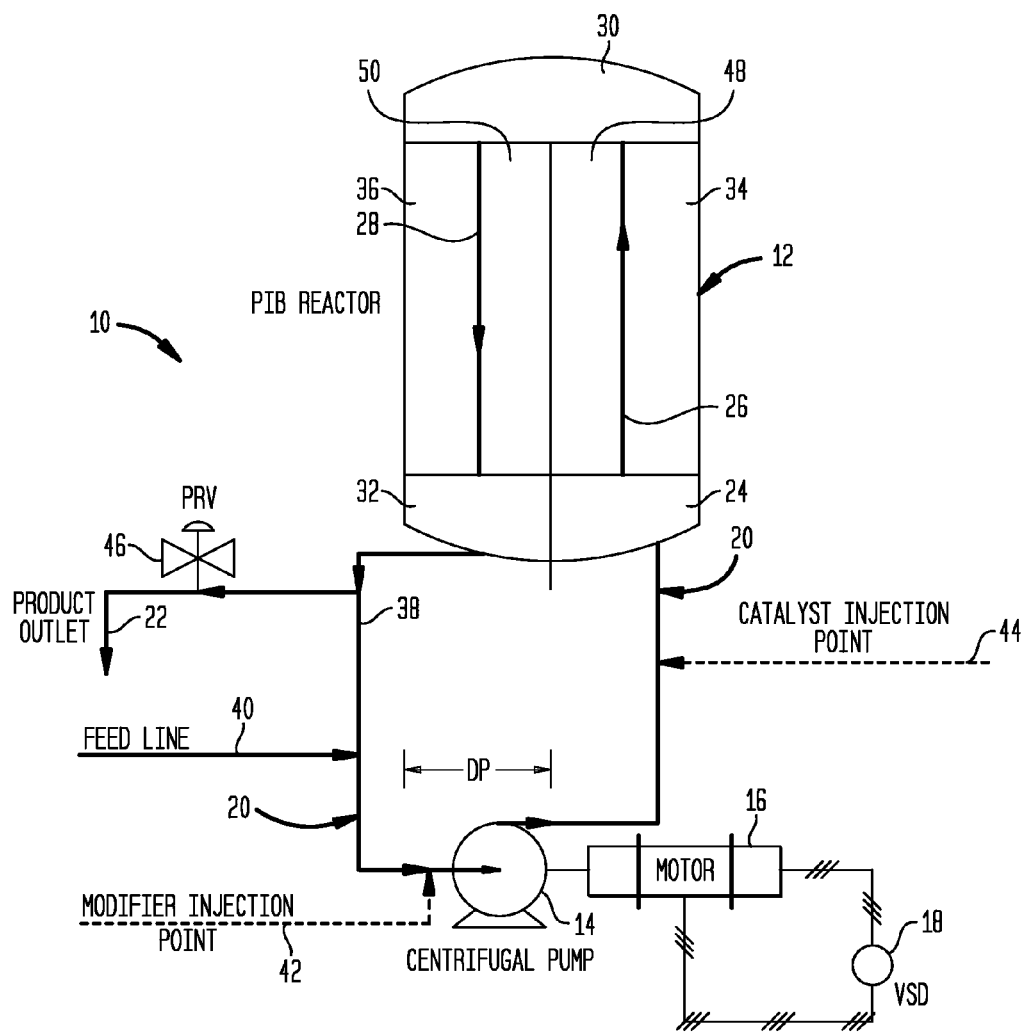
FIG. 3 is a schematic diagram of a loop reactor of the class useful in practicing the present invention.

Operation of the inventive process with a two-pass loop reactor is illustrated and described in connection in FIG. 3. In FIG. 3 there is shown schematically a reactor system 10 which includes a two-pass loop reactor 12, a recirculating pump 14 driven by a motor 16 with a variable speed drive 18, a feed and recirculation loop indicated at 20 and a product outlet at 22.

Reactor 12 incldes a feed chamber 24, a plurality of tubes indicated at 26 for upward flow, a plurality of tubes indicated at 28 for downward flow, as well as an upper plenum 30 and a receiving chamber 32 for circulated material. Reactor 12 is conventional in design and known in the art as a 1-2 shell and tube heat exchanger (1 shell, 2 pass). The reactor is suitably provided with 1164 tubes with tube outer diameter of 0.375" and a wall thickness of 0.035". The tubes are surrounded by a shell indicated at 34, 36 for circulating chilled coolant since the polymerization reaction is highly exothermic.

In operation, isobutylene feedstock is fed to a residual reactor stream 38 via a feed line 40 to form a reaction mixture which is optionally provided with catalyst modifier, typically methanol, at an injection point at 42 just upstream of pump 14. Pump 14 operates at a pressure differential, delta P, indicated in FIG. 3 to recirculate the reaction mixture in reactor 12 via loop 20. A catalyst injection port at 44 provides a catalyst complex, for example one comprising a 1:1 molar mixture of methanol and $BF_3$ to the reaction mixture upstream of feed chamber 24.

Variable speed drive 18 contacts motor 16 which drives pump 14 at a pressure differential, delta P, across the pump which, in turn, corresponds to a recirculating flow rate in the reactor for a reaction mixture. The flow characteristics of the reaction mixture are also influenced by temperature in the reactor, molecular weight, monomer and diluent content and so forth as is readily appreciated by one of skill in the art. The flow characteristics of the reaction mixture are thus controlled by feed and catalyst rates, conversion of monomer, mixture composition and the temperatures in the reactor as is seen in the examples which follow. For a given mixture, feed rates and temperature, recirculation rates and hence velocity of the reaction mixture in the tubes of the reactor is most conveniently controlled by controlling the speed of pump 14 to provide a pressure differential, delta P (DP in the diagram), across the pump.

The pump circulates the reaction mixture to feed chamber 24 where the mixture is fed to a plurality of upwardly directed tubes indicated at 26 where it flows to plenum 30 before being transferred to a plurality of downwardly directed tubes indicated at 28 where it flows to receiving chamber 32. A polymerized product is withdrawn at 22 through a pressure relief valve indicated at 46. Residual reactor stream 38 remains in the system and feed line 40 provides fresh monomer to the residual stream as discussed above. Reactor 12 is operated under pressure sufficient to maintain the reaction mixture and its components in liquid form at reaction temperatures, suitably in the range of from about 40° F. to about 90° F. Further details relating to the operation of reactor 12 are provided in European Patent 1 242 464, the disclosure of which is incorporated by reference.

Typically, the inventive process is operated wherein the recirculation rate is much higher than the feed rate as seen in the examples which follow. Coolant in the shell side of the reactor indicated at 34, 36, 48, 50 removes the heat of reaction. Any suitable coolant may be used, for example a 50:50 w/w mixture of water and methanol may be chilled and circulated in the shell section(s) to control reactor temperature.

Utilizing the procedure and materials described above, a 1-2 tube and shell reactor was operated to produce PIB using purified isobutylene diluted with isobutane and a $BF_3$/methanol catalyst and modifier system. Details and results appear in Tables 4-9. In Tables 4-9, "catalyst complex" refers to a 1:1 w/w mixture of $BF_3$/methanol. In these tables, the heat transfer coefficient, Q, is calculated from the log mean temperature difference as described immediately below and in connection with Equations (1)-(6) of FIG. 4.

The heat transferred (Q) may be calculated either using shell-side (chilling fluid) or tube side (process fluid) data by Equation (1).

Q (BTU/hr) was calculated using tube reaction side data.
The terms in Equation (1) are as follows:
m=mass flow rate of shell side fluid (methanol-water);
$c_p$=specific heat of the shell side (cooling) fluid;
$t_1$=chiller temperature inlet;
$t_2$=chiller temperature outlet;
M=mass flow rate of tube side fluid (process fluid)
$C_p$=specific heat of the tube side fluid (process fluid)
$T_1$=inlet temp of (reactor) process fluid;
$T_2$=outlet temperature of (reactor) process fluid;
The Fourier Equation for heat transfer relates the overall heat transfer co-efficient;

'U' to the amount of heat transfer (Q). For a 1-2 heat exchanger (1 shell and 2 tube passes), the equation can be written in the form of Equation (2) and Equation (3). (Process heat transfer, D. Q. Kern, McGraw Hill, 1950, pg 144).

Δt: of Equation (3) is also known as the log mean temperature difference (LMTD);

A=Area available for heat exchange

In Equation (4), $F_t$=fractional ratio of the true temperature difference to the LMTD.

For satisfactory operation of 1-2 heat exchangers, the value of $F_t$ is generally desired to be greater than 0.75 (Process heat transfer, D. Q. Kern, McGraw Hill, 1950, pg 145). $F_t$ can be calculated by Equations (4) and (5) or through figures relating the values of the dimensionless parameters R and S to $F_t$ (FIG. 18, pg 828, Kern, D. Q.).

R and S values for Equation 4 have been calculated in the Tables. $F_t$ has been calculated from the R and S values.

The overall 'U' can be recalculated by rearranging equation (2) into the form shown in Equation (6).

The overall U as shown in equation (6) also appears in Tables 4-7.

TABLE 4

Manufacture of Highly Reactive PIB, Nominal MN of 1000

| Example | Delta Pressure, psi | Conversion, w/w % | Mn | PDI | KVIS-100° C., cST | Alpha-V | Isobutylene, wt % | Isobutane, wt % |
|---|---|---|---|---|---|---|---|---|
| 1 | 25.00 | 65.37 | 1069 | 1.78 | 190 | 87 | 90.69 | 10.28 |
| 2 | 29.98 | 67.27 | 1056 | 1.80 | 191 | 86 | 90.54 | 10.40 |
| 3 | 30.00 | 66.73 | 1064 | 1.76 | 192 | 87 | 90.43 | 10.36 |
| 4 | 30.01 | 65.84 | | | 182 | | 90.29 | 10.56 |
| 5 | 29.96 | 66.56 | 1050 | 1.77 | 184 | 86 | 90.38 | 10.48 |
| 6 | 34.98 | 67.48 | 1146 | 1.79 | | 87 | 95.46 | 5.19 |
| 7 | 40.02 | 69.41 | 1091 | 1.78 | 178 | 88 | 95.72 | 5.24 |
| 8 | 50.04 | 70.77 | 1084 | 1.75 | 199 | 87 | 95.63 | 5.22 |
| 9 | 55.24 | 72.46 | 1083 | 1.76 | | 87 | 97.09 | 3.81 |
| 10 | 54.75 | 71.37 | | | 194 | 87 | 96.42 | 3.73 |
| 11 | 55.21 | 72.50 | 1136 | 1.80 | 194 | 87 | 96.72 | 3.47 |
| 12 | 59.90 | 73.98 | | | | | 96.40 | 3.51 |
| 13 | 65.05 | 73.77 | 1090 | 1.76 | 210 | 87 | 96.32 | 3.51 |
| 14 | 64.99 | 74.94 | 1082 | 1.74 | 169 | 86 | 96.73 | 3.52 |
| 15 | 65.03 | 74.96 | | | 195 | | 96.89 | 3.51 |
| 16 | 65.12 | 75.81 | 1087 | 1.74 | 194 | 85 | 97.14 | 3.58 |

| Example | Delta Pressure, psi | Feed rate, Gal/min | Catalyst Complex, ml/min | % change in catalyst | Methanol, ml/min | % change in methanol | Reactor temp. In,° F. | React temp Out,° F. |
|---|---|---|---|---|---|---|---|---|
| 1 | 25.00 | 46.14 | 71.93 | 0.00 | 31.10 | 0.00 | 52.11 | 44.83 |
| 2 | 29.98 | 46.02 | 70.67 | −1.76 | 31.14 | 0.12 | 52.03 | 45.27 |
| 3 | 30.00 | 46.00 | 70.39 | −2.15 | 31.02 | −0.26 | 52.02 | 45.27 |
| 4 | 30.01 | 46.08 | 70.77 | −1.62 | 31.09 | −0.04 | 52.00 | 45.35 |
| 5 | 29.96 | 45.95 | 70.25 | −2.35 | 31.08 | −0.06 | 52.18 | 45.38 |
| 6 | 34.98 | 44.89 | 71.15 | −1.09 | 31.13 | 0.11 | 51.56 | 45.20 |
| 7 | 40.02 | 44.88 | 69.79 | −2.99 | 30.91 | −0.60 | 53.70 | 47.45 |
| 8 | 50.04 | 45.02 | 69.41 | −3.51 | 31.14 | 0.13 | 53.62 | 47.78 |
| 9 | 55.24 | 46.22 | 70.94 | −1.38 | 31.17 | 0.23 | 53.27 | 47.84 |
| 10 | 54.75 | 45.93 | 71.11 | −1.15 | 31.03 | −0.23 | 53.49 | 47.87 |
| 11 | 55.21 | 45.99 | 66.53 | −7.52 | 27.85 | −10.44 | 56.50 | 50.95 |
| 12 | 59.90 | 45.96 | 65.34 | −9.16 | 28.29 | −9.03 | 58.11 | 52.57 |
| 13 | 65.05 | 46.34 | 62.66 | −12.89 | 25.74 | −17.23 | 57.93 | 52.68 |
| 14 | 64.99 | 46.20 | 62.60 | −12.98 | 25.81 | −17.01 | 58.24 | 52.78 |
| 15 | 65.03 | 46.07 | 63.07 | −12.32 | 26.20 | −15.74 | 58.01 | 52.70 |
| 16 | 65.12 | 44.09 | 61.77 | −14.14 | 25.94 | −16.58 | 57.14 | 52.42 |

| Example | Delta Pressure, psi | Chiller Temp In, ° F. | Chiller Temp Out, ° F. | Chiller Flow, GPM | Recirc Flow, GPM | Recirc/ Feed Ratio | Residence time, mins | PIB production rate, lbs/min |
|---|---|---|---|---|---|---|---|---|
| 1 | 25.00 | −6.76 | −1.61 | 2000 | 1195 | 25.90 | 4.25 | 161 |
| 2 | 29.98 | −7.02 | −1.83 | 1999 | 1342 | 29.15 | 4.26 | 165 |
| 3 | 30.00 | −6.89 | −1.69 | 2000 | 1350 | 29.34 | 4.26 | 164 |
| 4 | 30.01 | −8.75 | −3.59 | 2000 | 1348 | 29.24 | 4.25 | 161 |
| 5 | 29.96 | −8.80 | −3.61 | 2000 | 1346 | 29.30 | 4.27 | 163 |
| 6 | 34.98 | −7.56 | −2.47 | 1999 | 1454 | 32.39 | 4.37 | 170 |
| 7 | 40.02 | −6.91 | −1.72 | 2000 | 1541 | 34.34 | 4.37 | 176 |
| 8 | 50.04 | −6.58 | −1.24 | 2000 | 1740 | 38.66 | 4.35 | 180 |
| 9 | 55.24 | −4.89 | 0.64 | 1999 | 1851 | 40.06 | 4.24 | 192 |
| 10 | 54.75 | −3.73 | 1.81 | 2000 | 1861 | 40.52 | 4.27 | 186 |
| 11 | 55.21 | −3.78 | 1.77 | 2000 | 1831 | 39.82 | 4.26 | 190 |
| 12 | 59.90 | −3.71 | 1.91 | 1999 | 1908 | 41.52 | 4.26 | 193 |
| 13 | 65.05 | −3.53 | 2.18 | 2000 | 1986 | 42.86 | 4.23 | 194 |
| 14 | 64.99 | −3.45 | 2.25 | 2000 | 1985 | 42.97 | 4.24 | 197 |
| 15 | 65.03 | −2.88 | 2.80 | 2000 | 1986 | 43.10 | 4.25 | 197 |
| 16 | 65.12 | −3.10 | 2.50 | 2000 | 1992 | 45.19 | 4.45 | 191 |

TABLE 4-continued

Manufacture of Highly Reactive PIB, Nominal MN of 1000

| Example | Delta Pressure, psi | Catalyst Complex rate, lbs/min | Turnover number, lbs PIB/ lbs catalyst complex | Catalyst Efficiency, % improvement | Tube velocity, Ft/sec | Q, BTU/hr | LMTD | R |
|---|---|---|---|---|---|---|---|---|
| 1 | 25.00 | 0.2220 | 726 | 0.00 | 9.01 | −2459300 | 52.650 | 1.42 |
| 2 | 29.98 | 0.2181 | 757 | 4.31 | 10.1 | −2783400 | 53.066 | 1.30 |
| 3 | 30.00 | 0.2172 | 753 | 3.72 | 10.1 | −2803400 | 52.932 | 1.30 |
| 4 | 30.01 | 0.2184 | 739 | 1.82 | 10.1 | −2780500 | 54.844 | 1.29 |
| 5 | 29.96 | 0.2168 | 751 | 3.49 | 10.1 | −2796500 | 54.980 | 1.31 |
| 6 | 34.98 | 0.2196 | 776 | 6.90 | 11 | −2956800 | 53.392 | 1.25 |
| 7 | 40.02 | 0.2154 | 816 | 12.36 | 11.6 | −3200200 | 54.885 | 1.20 |
| 8 | 50.04 | 0.2142 | 838 | 15.46 | 13.2 | −3717100 | 54.601 | 1.09 |
| 9 | 55.24 | 0.2190 | 875 | 20.54 | 14 | −4091600 | 52.682 | 0.98 |
| 10 | 54.75 | 0.2195 | 849 | 16.90 | 14 | −4121400 | 51.635 | 1.02 |
| 11 | 55.21 | 0.2053 | 925 | 27.48 | 13.8 | −4066900 | 54.732 | 1.00 |
| 12 | 59.90 | 0.2017 | 958 | 31.91 | 14.4 | −4285300 | 56.241 | 0.99 |
| 13 | 65.05 | 0.1934 | 1003 | 38.17 | 15 | −4533700 | 55.979 | 0.92 |
| 14 | 64.99 | 0.1932 | 1021 | 40.68 | 15 | −4524600 | 56.112 | 0.96 |
| 15 | 65.03 | 0.1947 | 1013 | 39.52 | 15 | −4510900 | 55.394 | 0.94 |
| 16 | 65.12 | 0.1906 | 1004 | 38.25 | 15 | −4461700 | 55.080 | 0.84 |

| Example | Delta Pressure, psi | S | $F_t$ | $U = Q/(A*delT\_LMTD*F_t)$, Btu/(hr ft² ° F.) | increase in ht coeff, % |
|---|---|---|---|---|---|
| 1 | 25.00 | 0.087410 | 0.99774 | 42.68 | 0.00 |
| 2 | 29.98 | 0.087878 | 0.99791 | 47.91 | 12.27 |
| 3 | 30.00 | 0.088188 | 0.99791 | 48.38 | 13.37 |
| 4 | 30.01 | 0.084955 | 0.99809 | 46.30 | 8.50 |
| 5 | 29.96 | 0.085194 | 0.99805 | 46.46 | 8.86 |
| 6 | 34.98 | 0.086041 | 0.99810 | 50.58 | 18.52 |
| 7 | 40.02 | 0.085682 | 0.99820 | 53.25 | 24.77 |
| 8 | 50.04 | 0.088743 | 0.99825 | 62.17 | 45.67 |
| 9 | 55.24 | 0.095029 | 0.99819 | 70.92 | 66.19 |
| 10 | 54.75 | 0.096809 | 0.99805 | 72.90 | 70.82 |
| 11 | 55.21 | 0.092134 | 0.99828 | 67.85 | 58.99 |
| 12 | 59.90 | 0.090862 | 0.99835 | 69.57 | 63.02 |
| 13 | 65.05 | 0.092902 | 0.99840 | 73.94 | 73.27 |
| 14 | 64.99 | 0.092408 | 0.99835 | 73.62 | 72.52 |
| 15 | 65.03 | 0.093301 | 0.99835 | 74.35 | 74.23 |
| 16 | 65.12 | 0.092972 | 0.99854 | 73.95 | 73.28 |

A = 1097 sq. ft

TABLE 5

Manufacture of Highly Reactive PIB, Nominal MN of 2400

| Example | Delta Pressure, psi | Conversion, w/w % | Mn | PDI | KVIS-100° C., cST | Alpha-V | Isobutylene, wt % | Isobutane, wt % |
|---|---|---|---|---|---|---|---|---|
| 17 | 21.43 | 50.42 | 2399 | 2.19 | 1783.02 | 89 | 90.21 | 10.12 |
| 18 | 30.02 | 52.31 | | | | | 90.17 | 10.28 |
| 19 | 34.99 | 52.85 | | | | | 90.03 | 10.20 |
| 20 | 44.88 | 55.02 | 2365 | 2.08 | 1642.16 | 91 | 89.96 | 10.17 |
| 21 | 50.01 | 55.98 | | | | | 89.98 | 10.17 |
| 22 | 60.00 | 56.88 | | | | | 90.00 | 10.09 |
| 23 | 65.11 | 57.23 | 2419 | 1.94 | 1542.00 | 87 | 89.63 | 9.95 |

| Example | Delta Pressure, psi | Feed rate, Gal/min | Catalyst Complex, ml/min | % change in catalyst | Methanol, ml/min | % change in methanol | Reactor temp. In,° F. | React temp Out, ° F. |
|---|---|---|---|---|---|---|---|---|
| 17 | 21.43 | 55.05 | 80.17 | 0.00 | 31.79 | 0.00 | 25.51 | 19.40 |
| 18 | 30.02 | 55.49 | 78.07 | −2.62 | 29.84 | −6.15 | 27.45 | 21.24 |
| 19 | 34.99 | 54.98 | 76.05 | −5.14 | 27.89 | −12.27 | 27.30 | 22.67 |
| 20 | 44.88 | 55.33 | 75.06 | −6.38 | 25.66 | −19.30 | 26.77 | 22.09 |
| 21 | 50.01 | 54.83 | 73.86 | −7.86 | 24.66 | −22.45 | 28.93 | 22.09 |
| 22 | 60.00 | 55.04 | 71.96 | −10.24 | 23.91 | −24.81 | 29.23 | 24.02 |
| 23 | 65.11 | 55.39 | 69.11 | −13.79 | 23.38 | −26.44 | 29.76 | 24.57 |

TABLE 5-continued

Manufacture of Highly Reactive PIB, Nominal MN of 2400

| Example | Delta Pressure, psi | Chiller Temp In, °F. | Chiller Temp Out, °F. | Chiller Flow, GPM | Recirc Flow, GPM | Recirc/Feed Ratio | Residence time, mins | PIB production rate, lbs/min |
|---|---|---|---|---|---|---|---|---|
| 17 | 21.43 | −12.63 | −8.05 | 2005 | 1659 | 30.14 | 3.56 | 148 |
| 18 | 30.02 | −11.32 | −6.58 | 2000 | 1757 | 31.67 | 3.53 | 154 |
| 19 | 34.99 | −9.83 | −6.03 | 1999 | 1827 | 33.23 | 3.57 | 154 |
| 20 | 44.88 | −9.57 | −5.70 | 1999 | 1947 | 35.19 | 3.54 | 161 |
| 21 | 50.01 | −8.71 | −3.18 | 1995 | 1998 | 36.44 | 3.57 | 163 |
| 22 | 60.00 | −8.07 | −2.55 | 2002 | 2101 | 38.18 | 3.56 | 166 |
| 23 | 65.11 | −7.19 | −1.66 | 2001 | 2149 | 38.80 | 3.54 | 167 |

| Example | Delta Pressure, psi | Catalyst Complex rate, lbs/min | Turnover number, lbs PIB/lbs catalyst complex | Catalyst Efficiency, % improvement | Tube velocity, Ft/sec | Q, BTU/hr | LMTD | R |
|---|---|---|---|---|---|---|---|---|
| 17 | 21.43 | 0.2474 | 596 | 0.00 | 12.5 | −3042400 | 32.790 | 1.33 |
| 18 | 30.02 | 0.2410 | 640 | 7.34 | 13.3 | −3331000 | 33.291 | 1.31 |
| 19 | 34.99 | 0.2347 | 657 | 10.13 | 13.8 | −2773600 | 32.913 | 1.22 |
| 20 | 44.88 | 0.2317 | 697 | 16.84 | 14.7 | −3006700 | 32.061 | 1.21 |
| 21 | 50.01 | 0.2280 | 714 | 19.73 | 15 | −4417100 | 31.449 | 1.24 |
| 22 | 60.00 | 0.2221 | 747 | 25.37 | 15.9 | −4639000 | 31.936 | 0.94 |
| 23 | 65.11 | 0.2133 | 785 | 31.61 | 16.2 | −4752700 | 31.59 | 0.94 |

| Example | Delta Pressure, psi | S | $F_t$ | $U = Q/(A*delT\_LMTD*F_t)$ Btu/(hr ft$^2$ ° F.) | increase in ht coeff, % |
|---|---|---|---|---|---|
| 17 | 21.43 | 0.12026 | 0.99564 | 84.95 | 0.00 |
| 18 | 30.02 | 0.1223 | 0.99556 | 91.62 | 7.85 |
| 19 | 34.99 | 0.10228 | 0.99729 | 77.03 | −9.33 |
| 20 | 44.88 | 0.1063 | 0.99706 | 85.74 | 0.93 |
| 21 | 50.01 | 0.1469 | 0.9936 | 128.86 | 51.68 |
| 22 | 60.00 | 0.1480 | 0.99528 | 133.04 | 56.61 |
| 23 | 65.11 | 0.14972 | 0.99519 | 137.81 | 62.22 |

A = 1097 sq. ft

TABLE 6

Manufacture of Mid-Range Vinylidene PIB, Nominal Mn of 3000

| Example | Delta Pressure, psi | Conversion, w/w % | Mn | PDI | KVIS-100° C., cST | Alpha-V | Isobutylene, wt % | Isobutane, wt % |
|---|---|---|---|---|---|---|---|---|
| 24 | 35.00 | 51.20 | 2997 | 2.71 | 3623 | 69 | 89.81 | 10.90 |
| 25 | 34.95 | 52.24 | | | | | 90.28 | 10.96 |
| 26 | 40.03 | 53.94 | | | | | 90.33 | 11.00 |
| 27 | 44.99 | 54.04 | | | | | 90.21 | 11.02 |
| 28 | 49.98 | 55.04 | 3004 | 2.47 | 3361 | 69 | 90.22 | 11.01 |
| 29 | 54.97 | 57.20 | | | | | 90.25 | 10.95 |
| 30 | 54.94 | 57.99 | | | | | 90.90 | 10.25 |
| 31 | 64.97 | 59.39 | | | | | 90.67 | 10.41 |
| 32 | 65.03 | 59.09 | | | | | 90.56 | 10.31 |
| 33 | 65.01 | 59.97 | | | | | 90.46 | 10.26 |
| 34 | 64.96 | 60.18 | | | | | 90.50 | 10.31 |
| 35 | 65.02 | 59.73 | 3118 | 2.36 | 3310 | 67 | 90.41 | 10.52 |

| Example | Delta Pressure, psi | Feed rate, Gal/min | Catalyst Complex, ml/min | % change in catalyst | Methanol, ml/min | % change in methanol | Reactor temp. In, °F. | React temp Out, °F. |
|---|---|---|---|---|---|---|---|---|
| 24 | 35.00 | 44.89 | 29.03 | 0.00 | 0.00 | 0.00 | 42.69 | 37.94 |
| 25 | 34.95 | 44.99 | 29.71 | 2.34 | 0.00 | 0.00 | 42.78 | 37.91 |
| 26 | 40.03 | 44.83 | 27.17 | −6.38 | 0.00 | 0.00 | 43.15 | 38.32 |
| 27 | 44.99 | 44.79 | 24.53 | −15.50 | 0.00 | 0.00 | 43.09 | 38.55 |
| 28 | 49.98 | 44.86 | 24.90 | −14.23 | 0.00 | 0.00 | 43.07 | 38.62 |
| 29 | 54.97 | 44.90 | 24.67 | −15.01 | 0.00 | 0.00 | 43.27 | 38.85 |
| 30 | 54.94 | 45.04 | 23.88 | −17.75 | 0.00 | 0.00 | 43.22 | 38.86 |
| 31 | 64.97 | 44.93 | 24.41 | −15.91 | 0.00 | 0.00 | 42.96 | 39.00 |
| 32 | 65.03 | 44.87 | 24.43 | −15.83 | 0.00 | 0.00 | 43.43 | 38.97 |
| 33 | 65.01 | 45.05 | 23.78 | −18.07 | 0.00 | 0.00 | 43.15 | 38.95 |

TABLE 6-continued

Manufacture of Mid-Range Vinylidene PIB, Nominal Mn of 3000

| | | | | | | | | |
|---|---|---|---|---|---|---|---|---|
| 34 | 64.96 | 45.02 | 25.05 | −13.70 | 0.00 | 0.00 | 43.26 | 38.95 |
| 35 | 65.02 | 44.92 | 23.52 | −18.97 | 0.00 | 0.00 | 43.11 | 38.97 |

| Example | Delta Pressure, psi | Chiller Temp In, °F. | Chiller Temp Out, °F. | Chiller Flow, GPM | Recirc Flow, GPM | Recirc/ Feed Ratio | Residence time, mins | PIB production rate, lbs/min |
|---|---|---|---|---|---|---|---|---|
| 24 | 35.00 | −12.37 | −8.80 | 1993 | 1139 | 25.37 | 4.37 | 122 |
| 25 | 34.95 | −12.95 | −9.23 | 2001 | 1147 | 25.50 | 4.36 | 125 |
| 26 | 40.03 | −12.82 | −8.92 | 2000 | 1312 | 29.27 | 4.37 | 129 |
| 27 | 44.99 | −13.08 | −9.26 | 1993 | 1490 | 33.26 | 4.38 | 129 |
| 28 | 49.98 | −12.93 | −9.02 | 2006 | 1652 | 36.84 | 4.37 | 131 |
| 29 | 54.97 | −12.61 | −8.53 | 2000 | 1749 | 38.95 | 4.37 | 137 |
| 30 | 54.94 | −12.93 | −8.80 | 1999 | 1743 | 38.70 | 4.35 | 140 |
| 31 | 64.97 | −13.08 | −8.80 | 1998 | 1917 | 42.66 | 4.36 | 143 |
| 32 | 65.03 | −12.90 | −8.72 | 2000 | 1920 | 42.78 | 4.37 | 141 |
| 33 | 65.01 | −12.27 | −8.01 | 1999 | 1934 | 42.94 | 4.35 | 144 |
| 34 | 64.96 | −12.18 | −7.93 | 2000 | 1934 | 42.95 | 4.35 | 144 |
| 35 | 65.02 | −12.67 | −8.40 | 2001 | 1931 | 42.98 | 4.36 | 143 |

| Example | Delta Pressure, psi | Catalyst Complex rate, lbs/min | Turnover number, lbs PIB/ lbs catalyst complex | Catalyst Efficiency, % improvement | Tube velocity, Ft/sec | Q, BTU/hr | LMTD | R |
|---|---|---|---|---|---|---|---|---|
| 24 | 35.00 | 0.0896 | 1358 | −31.05 | 8.6 | −1622200 | 50.895 | 1.33 |
| 25 | 34.95 | 0.0917 | 1364 | −30.74 | 8.7 | −1705400 | 51.431 | 1.31 |
| 26 | 40.03 | 0.0839 | 1535 | −22.06 | 9.9 | −2049500 | 51.602 | 1.24 |
| 27 | 44.99 | 0.0757 | 1699 | −13.68 | 11.2 | −2276400 | 51.988 | 1.19 |
| 28 | 49.98 | 0.0768 | 1708 | −13.25 | 12.5 | −2580600 | 51.818 | 1.14 |
| 29 | 54.97 | 0.0761 | 1794 | −8.89 | 13.2 | −2852500 | 51.629 | 1.08 |
| 30 | 54.94 | 0.0737 | 1898 | −3.60 | 13.2 | −2878300 | 51.906 | 1.06 |
| 31 | 64.97 | 0.0753 | 1892 | −3.89 | 14.5 | −3279200 | 51.925 | 0.93 |
| 32 | 65.03 | 0.0754 | 1876 | −4.71 | 14.5 | −3204600 | 52.004 | 1.07 |
| 33 | 65.01 | 0.0734 | 1962 | −0.36 | 14.6 | −3295200 | 51.185 | 0.99 |
| 34 | 64.96 | 0.0773 | 1868 | −5.11 | 14.6 | −3281800 | 51.165 | 1.02 |
| 35 | 65.02 | 0.0726 | 1969 | 0.00 | 14.6 | −3299300 | 51.580 | 0.97 |

| Example | Delta Pressure, psi | S | $F_t$ | $U = Q/(A*delT\_LMTD*F_t)$, Btu/(hr ft² °F.) | increase in ht coeff, % |
|---|---|---|---|---|---|
| 24 | 35.00 | 0.064719 | 0.99890 | 29.09 | 0.00 |
| 25 | 34.95 | 0.066706 | 0.99885 | 30.26 | 4.03 |
| 26 | 40.03 | 0.069802 | 0.99881 | 36.25 | 24.62 |
| 27 | 44.99 | 0.068036 | 0.99892 | 39.96 | 37.37 |
| 28 | 49.98 | 0.069758 | 0.99891 | 45.45 | 56.24 |
| 29 | 54.97 | 0.073000 | 0.99887 | 50.42 | 73.34 |
| 30 | 54.94 | 0.073558 | 0.99888 | 50.61 | 73.98 |
| 31 | 64.97 | 0.076348 | 0.99895 | 57.63 | 98.12 |
| 32 | 65.03 | 0.074131 | 0.99885 | 56.24 | 93.34 |
| 33 | 65.01 | 0.076881 | 0.99885 | 58.75 | 101.98 |
| 34 | 64.96 | 0.076561 | 0.99883 | 58.54 | 101.24 |
| 35 | 65.02 | 0.076612 | 0.99889 | 58.37 | 100.68 |

A = 1097 sq. ft

TABLE 7

Manufacture of Mid-Range Vinylidene PIB, Nominal Mn of 3300

| Example | Delta Pressure, psi | Conversion, w/w % | Mn | PDI | KVIS-100° C., cST | Alpha-V | Isobutylene, wt % | Isobutane, wt % |
|---|---|---|---|---|---|---|---|---|
| 36 | 34.99 | 51.74 | | | | | 90.48 | 9.81 |
| 37 | 34.97 | 52.06 | | | | | 90.22 | 10.10 |
| 38 | 35.00 | 51.18 | 3208 | 2.67 | 4197 | 67 | 90.33 | 10.14 |
| 39 | 35.07 | 51.70 | | | | | 90.55 | 10.12 |
| 40 | 34.97 | 51.91 | 3284 | 2.62 | 4106 | 68 | 90.54 | 10.19 |
| 41 | 49.94 | 55.10 | | | | | 90.65 | 10.11 |
| 42 | 52.04 | 54.33 | | | | | 90.62 | 10.17 |
| 43 | 55.02 | 55.24 | | | | | 90.57 | 10.18 |
| 44 | 60.02 | 58.09 | 3367 | 2.51 | 4178 | 70 | 90.54 | 10.18 |

TABLE 7-continued

Manufacture of Mid-Range Vinylidene PIB, Nominal Mn of 3300

| | | | | | | | | |
|---|---|---|---|---|---|---|---|---|
| 45 | 64.99 | 61.86 | | | | | 90.31 | 10.02 |
| 46 | 65.06 | 62.04 | 3560 | 2.47 | 4485 | 67 | 90.33 | 10.04 |

| Example | Delta Pressure, psi | Feed rate, Gal/min | Catalyst Complex, ml/min | % change in catalyst | Methanol, ml/min | % change in methanol | Reactor temp. in,° F. | React temp Out, ° F. |
|---|---|---|---|---|---|---|---|---|
| 36 | 34.99 | 40.41 | 24.13 | 0.00 | 0.00 | 0.00 | 35.10 | 30.35 |
| 37 | 34.97 | 40.31 | 23.69 | −1.80 | 0.00 | 0.00 | 35.89 | 30.19 |
| 38 | 35.00 | 39.92 | 23.52 | −2.53 | 0.00 | 0.00 | 35.38 | 30.23 |
| 39 | 35.07 | 39.80 | 22.98 | −4.77 | 0.00 | 0.00 | 34.95 | 29.77 |
| 40 | 34.97 | 40.10 | 23.34 | −3.26 | 0.00 | 0.00 | 34.74 | 29.85 |
| 41 | 49.94 | 39.91 | 22.33 | −7.44 | 0.00 | 0.00 | 34.01 | 29.64 |
| 42 | 52.04 | 40.07 | 21.51 | −10.86 | 0.00 | 0.00 | 33.02 | 28.74 |
| 43 | 55.02 | 40.15 | 22.51 | −6.70 | 0.00 | 0.00 | 33.24 | 28.81 |
| 44 | 60.02 | 40.00 | 21.38 | −11.40 | 0.00 | 0.00 | 32.92 | 28.94 |
| 45 | 64.99 | 39.96 | 20.74 | −14.05 | 0.00 | 0.00 | 34.92 | 31.00 |
| 46 | 65.06 | 39.97 | 20.76 | −13.95 | 0.00 | 0.00 | 36.12 | 32.43 |

| Example | Delta Pressure, psi | Chiller temp in, ° F. | Chiller Temp Out, ° F. | Chiller Flow, GPM | Recirc Flow, GPM | Recirc/Feed Ratio | Residence time, mins | PIB production rate, lbs/min |
|---|---|---|---|---|---|---|---|---|
| 36 | 34.99 | −12.87 | −9.41 | 1999 | 1182 | 29.26 | 4.85 | 111 |
| 37 | 34.97 | −12.70 | −9.21 | 2002 | 1174 | 29.12 | 4.86 | 112 |
| 38 | 35.00 | −12.76 | −9.29 | 1999 | 1160 | 29.07 | 4.91 | 109 |
| 39 | 35.07 | −12.61 | −9.12 | 2000 | 1182 | 29.70 | 4.92 | 110 |
| 40 | 34.97 | −12.82 | −9.33 | 1998 | 1203 | 30.00 | 4.89 | 111 |
| 41 | 49.94 | −12.88 | −9.15 | 2003 | 1593 | 39.93 | 4.91 | 117 |
| 42 | 52.04 | −12.84 | −9.15 | 2000 | 1645 | 41.06 | 4.89 | 116 |
| 43 | 55.02 | −12.95 | −9.23 | 1999 | 1696 | 42.23 | 4.88 | 118 |
| 44 | 60.02 | −12.62 | −8.75 | 2000 | 1790 | 44.75 | 4.90 | 124 |
| 45 | 64.99 | −12.95 | −8.84 | 2001 | 1935 | 48.41 | 4.90 | 132 |
| 46 | 65.06 | −12.82 | −8.68 | 2000 | 1930 | 48.28 | 4.90 | 132 |

| Example | Delta Pressure, psi | Catalyst Complex rate, lbs/min | Turnover number, lbs PIB/lbs catalyst complex | Catalyst Efficiency, % improvement | Tube velocity, Ft/sec | Q, BTU/hr | LMTD | R |
|---|---|---|---|---|---|---|---|---|
| 36 | 34.99 | 0.0745 | 1497 | 0.00 | 8.9 | −1634600 | 43.860 | 1.38 |
| 37 | 34.97 | 0.0731 | 1525 | 1.91 | 8.9 | −1640400 | 43.988 | 1.63 |
| 38 | 35.00 | 0.0726 | 1498 | 0.09 | 8.8 | −1611100 | 43.822 | 1.48 |
| 39 | 35.07 | 0.0709 | 1548 | 3.42 | 8.9 | −1648400 | 43.222 | 1.49 |
| 40 | 34.97 | 0.0720 | 1541 | 2.97 | 9.1 | −1676600 | 43.364 | 1.40 |
| 41 | 49.94 | 0.0689 | 1704 | 13.83 | 12 | −2375900 | 42.840 | 1.17 |
| 42 | 52.04 | 0.0664 | 1751 | 16.99 | 12.4 | −2429100 | 41.875 | 1.16 |
| 43 | 55.02 | 0.0695 | 1704 | 13.82 | 12.8 | −2522100 | 42.114 | 1.19 |
| 44 | 60.02 | 0.0660 | 1878 | 25.49 | 13.5 | −2765400 | 41.614 | 1.03 |
| 45 | 64.99 | 0.0640 | 2055 | 37.29 | 14.6 | −3185200 | 43.853 | 0.95 |
| 46 | 65.06 | 0.0641 | 2060 | 37.62 | 14.6 | −3198400 | 45.020 | 0.89 |

| Example | Delta Pressure, psi | S | $F_t$ | $U = Q/(A*delT\_LMTD*F_t)$, Btu/(hr ft² ° F.) | increase in ht coeff, % |
|---|---|---|---|---|---|
| 36 | 34.99 | 0.072081 | 0.99857 | 34.02 | 0.00 |
| 37 | 34.97 | 0.071930 | 0.99828 | 34.05 | 0.09 |
| 38 | 35.00 | 0.072149 | 0.99844 | 33.57 | −1.34 |
| 39 | 35.07 | 0.073324 | 0.99838 | 34.82 | 2.35 |
| 40 | 34.97 | 0.073315 | 0.99849 | 35.30 | 3.75 |
| 41 | 49.94 | 0.079522 | 0.99851 | 50.63 | 48.82 |
| 42 | 52.04 | 0.080513 | 0.99849 | 52.96 | 55.66 |
| 43 | 55.02 | 0.080549 | 0.99845 | 54.68 | 60.71 |
| 44 | 60.02 | 0.084865 | 0.99851 | 60.67 | 78.32 |
| 45 | 64.99 | 0.086017 | 0.99859 | 66.30 | 94.88 |
| 46 | 65.06 | 0.084712 | 0.99874 | 64.84 | 90.59 |

A = 1097 sq. ft

Figure 2:
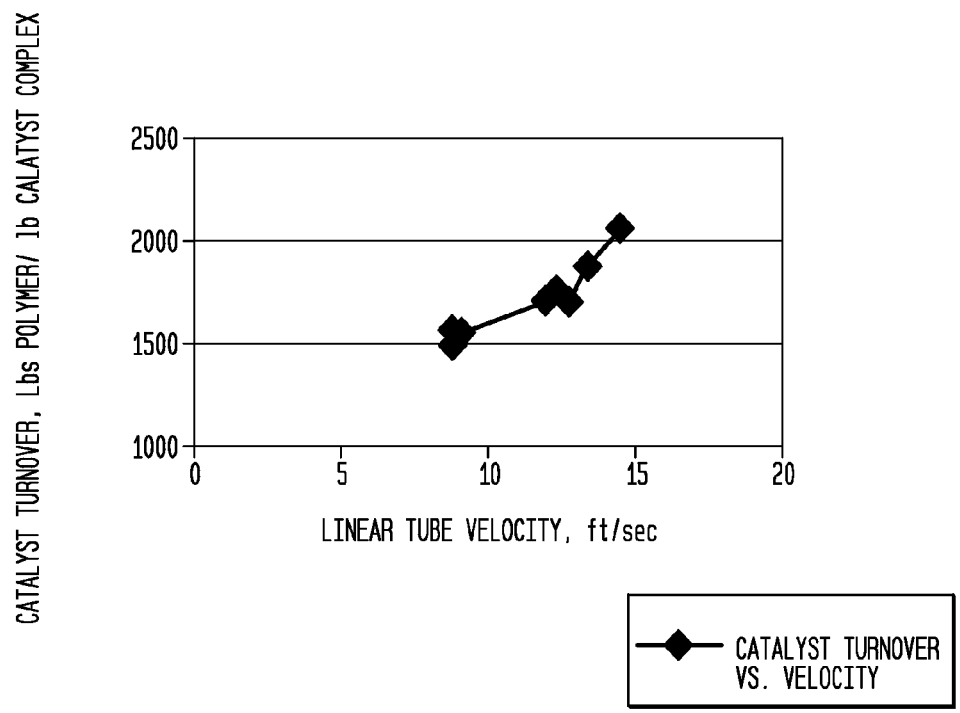
FIG. 2 is a plot of catalyst turnover as a function of the linear velocity of the reaction mixture in the tubes of a loop reactor.
Figure 5:
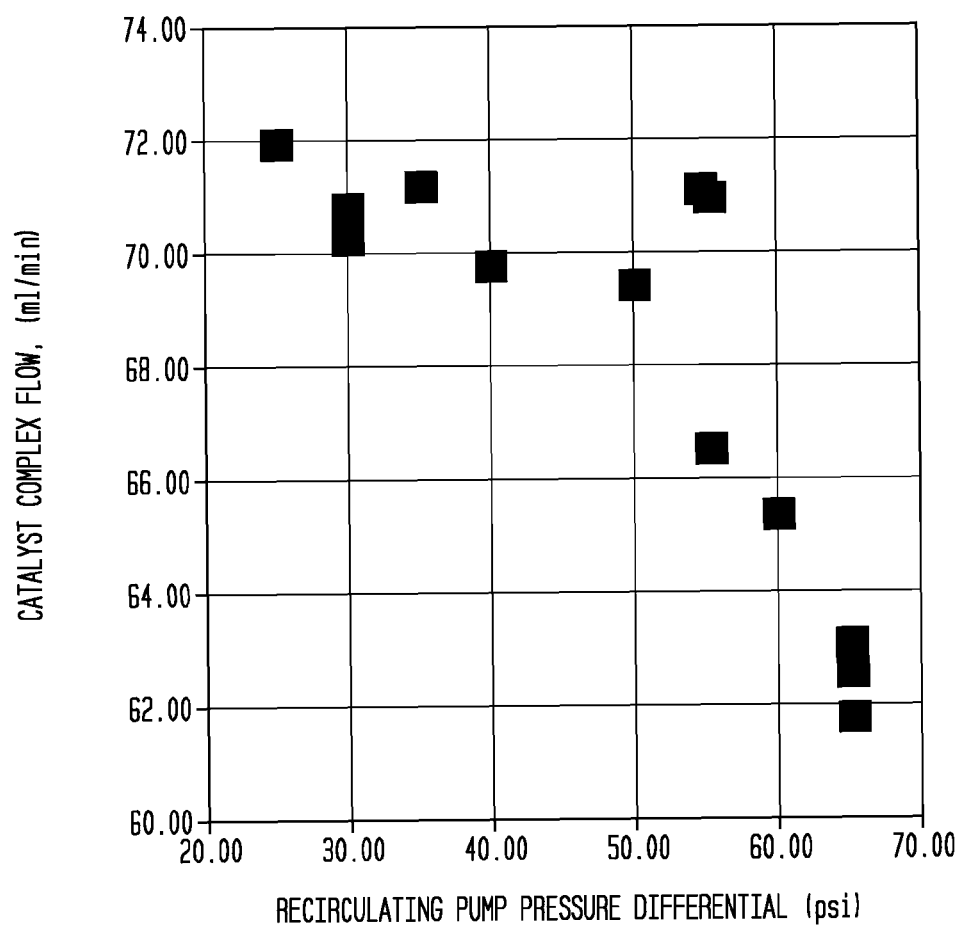
FIG. 5 is a plot of catalyst feed as a function of pressure differential across a recirculating pump in a loop reactor.
Figure 6:
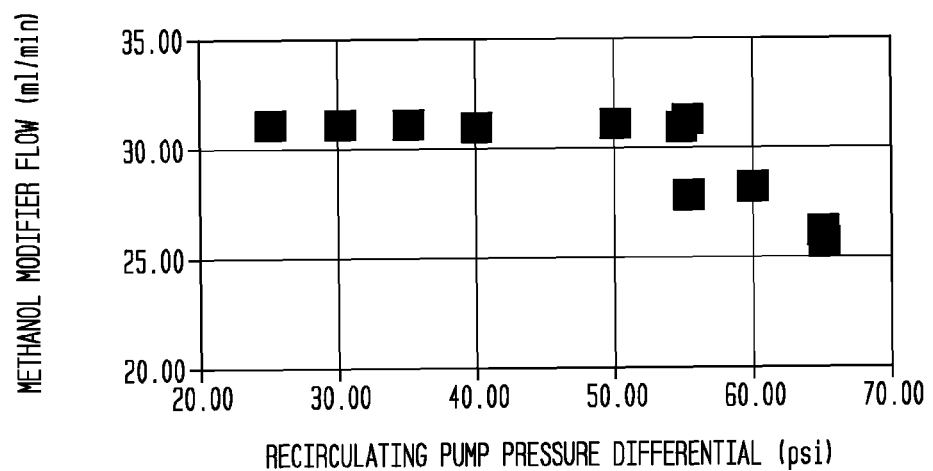
FIG. 6 is a plot of methanol feed as a function of pressure differential across a recirculating pump in a loop reactor.
Figure 7:
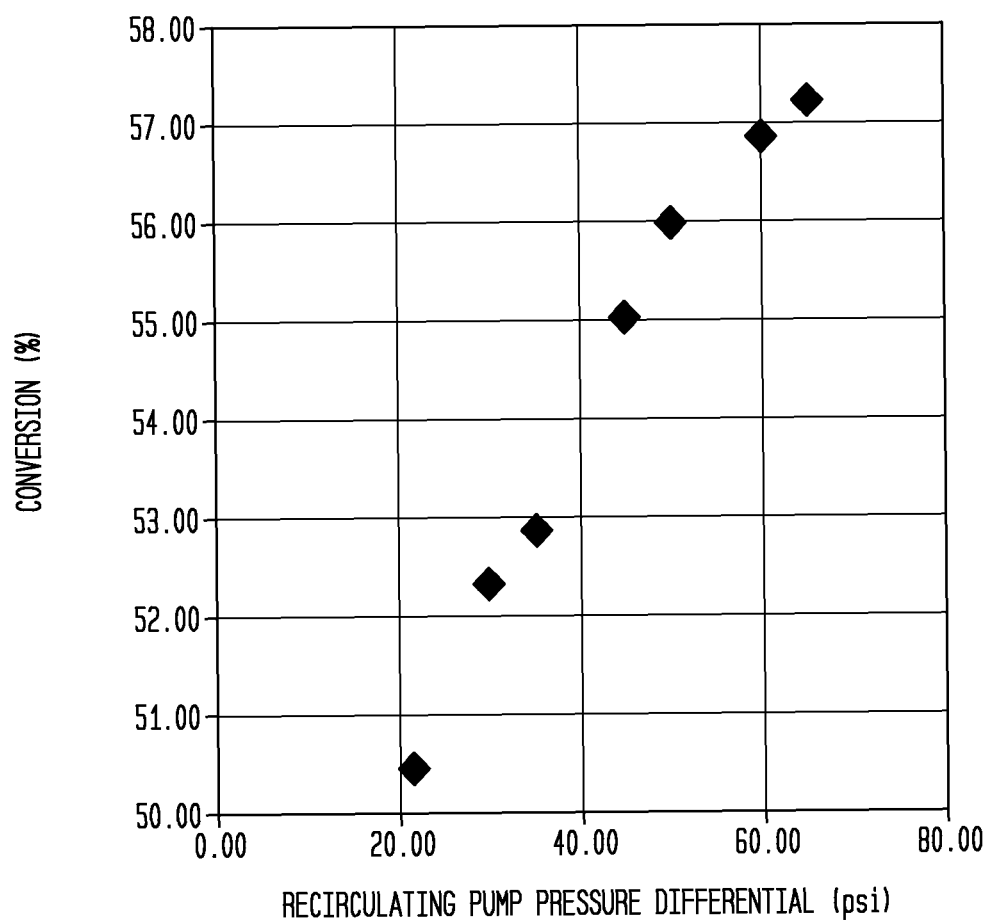
FIG. 7 is a plot of conversion versus pressure differential across a recirculating pump in a loop reactor.

The various features and advantages of the invention are readily apparent from Tables 4-7 and the appended Figures. Table 4 provides results for high vinylidene, HR PIB having a number average molecular weight of about 1000. It is seen in FIG. 1 that conversion increases dramatically as the pressure differential, delta P, across the recirculating pump increases along with the linear velocity of the reaction mixture within the tubes of the reactor. Catalyst productivity also increases dramatically throughout the foregoing examples as pressure differential and linear velocity is increased. Note FIGS. 2, 5 where this aspect is illustrated. When making HR PIB, it is seen modifier consumption is reduced at high circulation rates, while conversion is increased; see FIGS. 6, 7.

Figure 8:
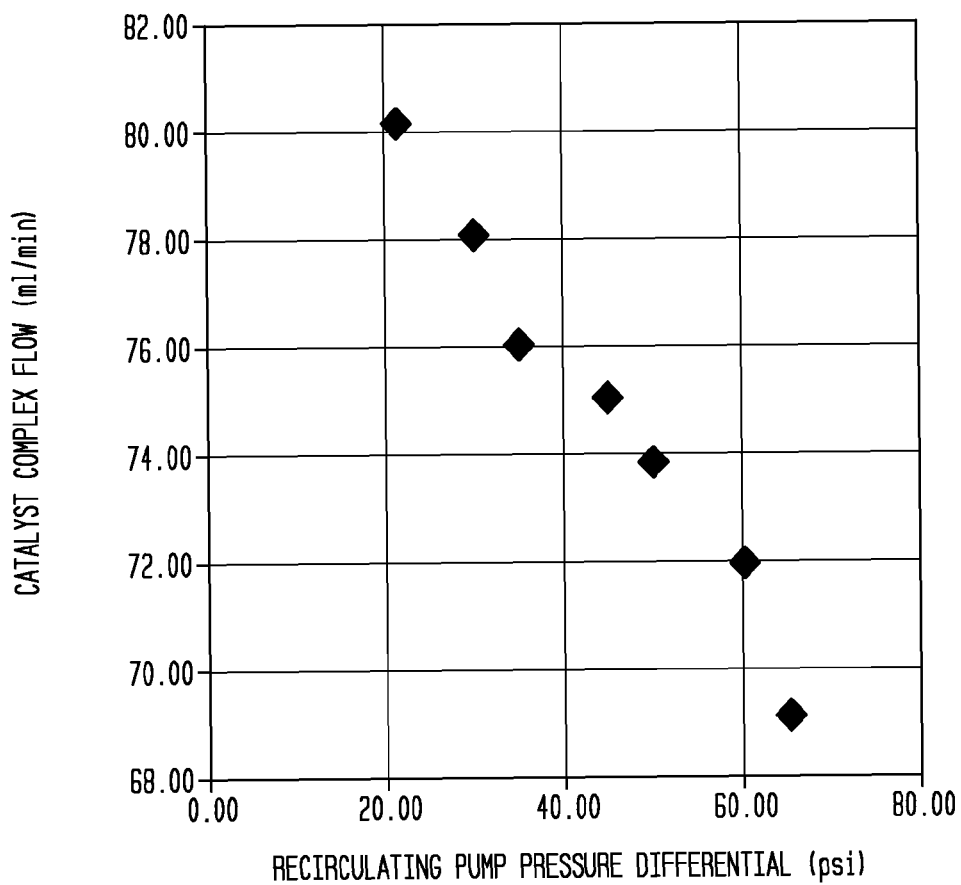
FIG. 8 is a plot of catalyst feed versus pressure differential across a recirculating pump in a loop reactor.
Figure 9:
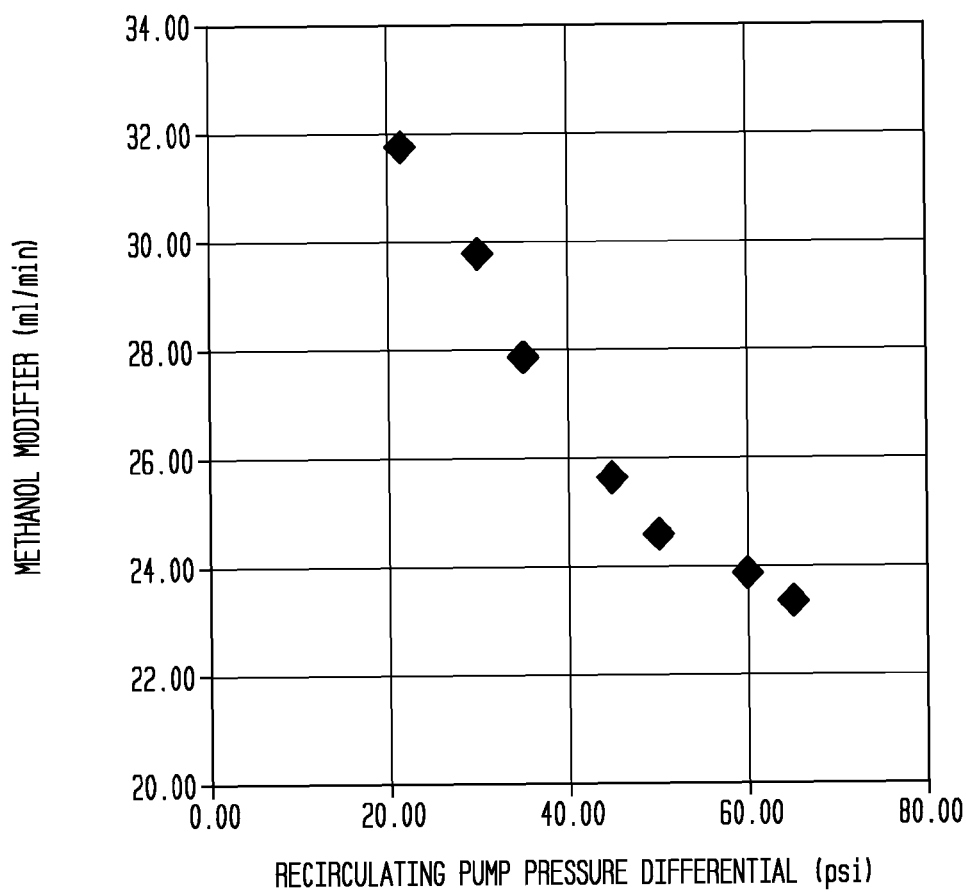
FIG. 9 is a plot of methanol feed versus pressure differential across a recirculating pump in a loop reactor.
Figure 10:
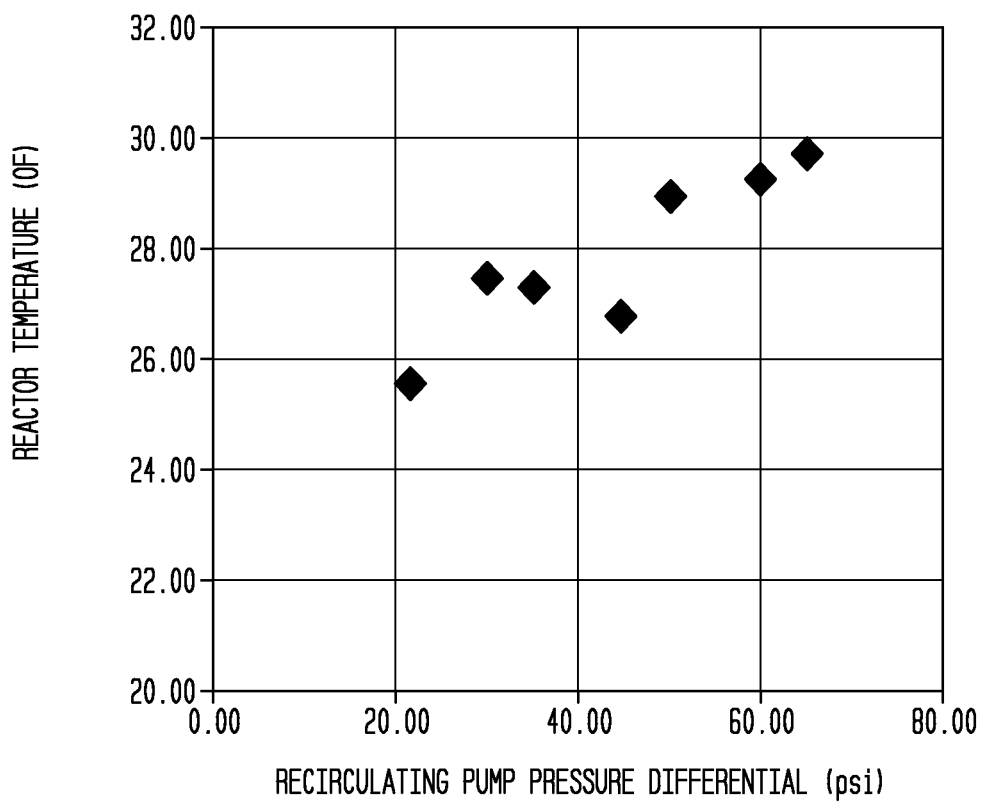
FIG. 10 is a plot of reactor temperature versus pressure differential across a loop reactor.

Like results are seen with higher molecular weight HR PIB as linear velocity increases in the reaction system. At residence times of 3.5 minutes, conversion increases from 50 to nearly 60 weight percent (FIG. 7) while catalyst complex flow is reduced 12-15 percent (FIG. 8). Modifier consumption, in this case methanol, is reduced even more (FIG. 9). Reactor inlet temperature increases at higher circulation rates (FIG. 10), improving heat transfer in the process.

Figure 11:
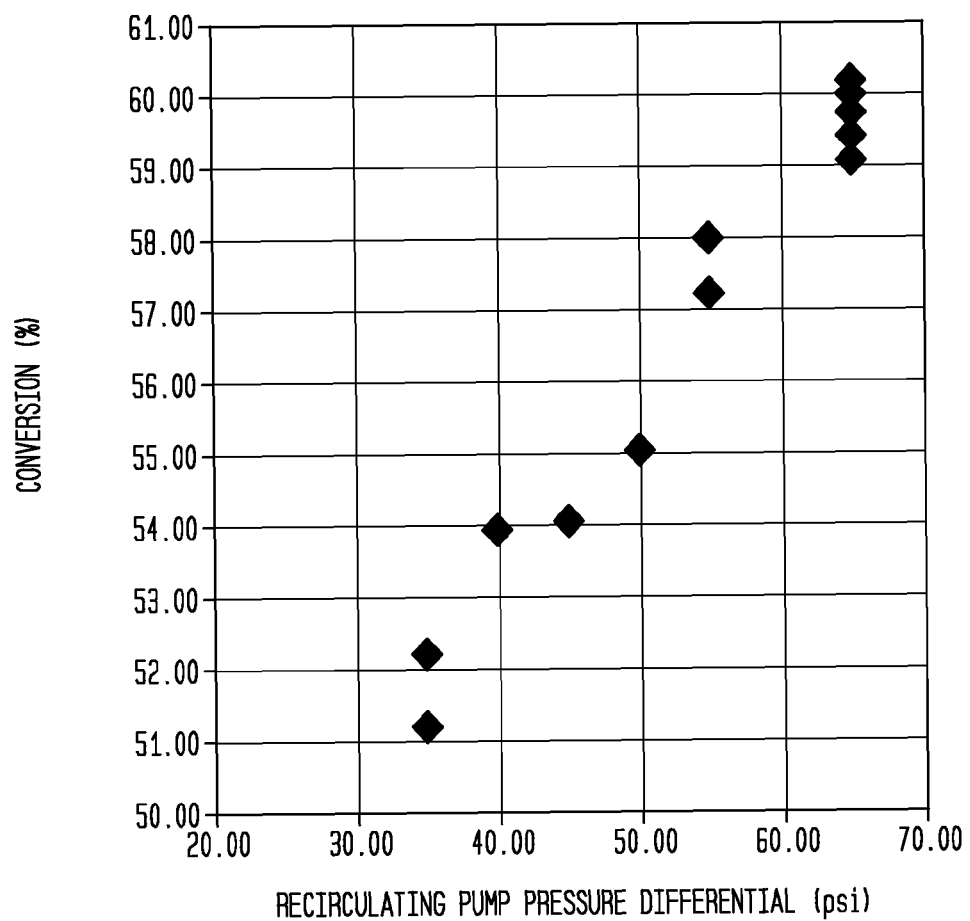
FIG. 11 is a plot of conversion versus pressure differential across a recirculating pump in a loop reactor.
Figure 12:
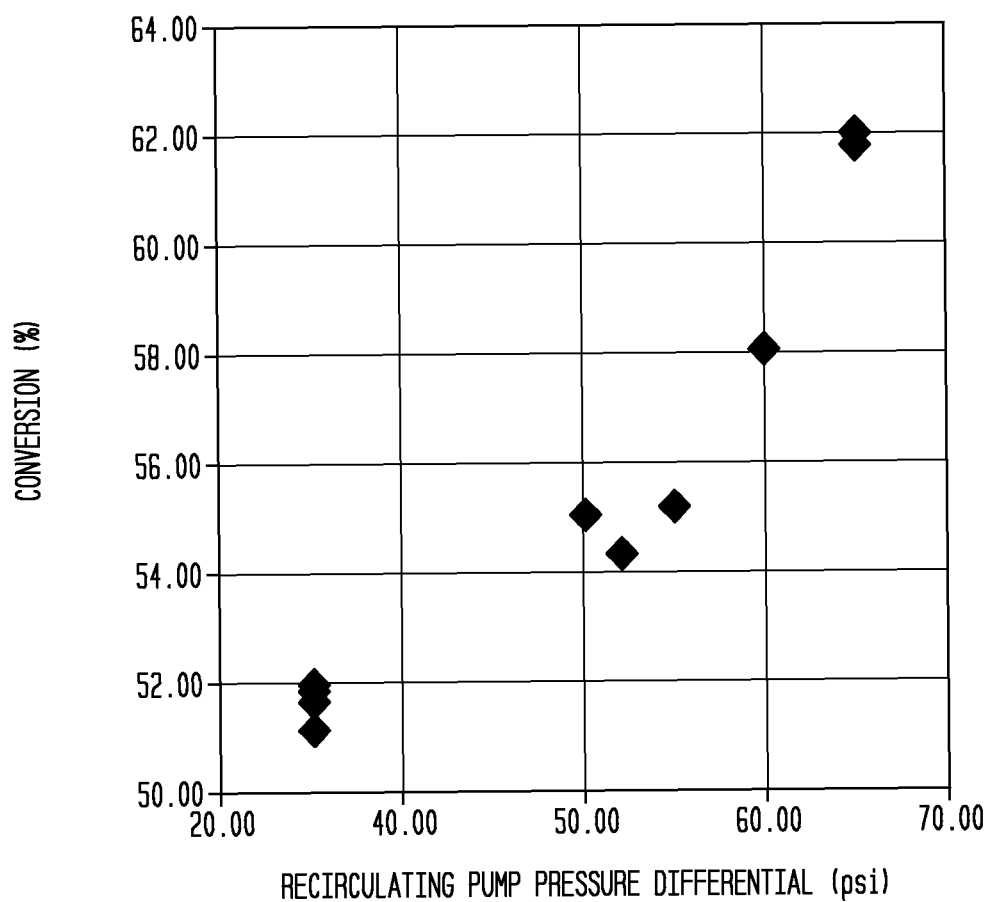
FIG. 12 is likewise a plot of conversion versus pressure differential across a recirculating pump in a loop reactor.

Like results are also seen with mid-range vinylidene products produced as described in Tables 6, 7. Conversion rates increase dramatically as pressure differential and linear velocity increase (FIGS. 11, 12).

Catalyst productivity (efficiency) is unexpectedly improved as compared to prior art systems. In Table 8, the process of the invention is compared with prior art reaction systems. Details as to calculation are summarized in Table 9. Catalyst productivity ranges from about 650 lbs polymer/lb catalyst complex up to about 2000 lbs polymer/lb catalyst complex with the process of the invention versus from about 150 lbs polymer/lb catalyst complex to about 300 lbs polymer/lb catalyst complex as reported in the prior art. When calculated based on $BF_3$ only, similar increases in productivity are provided.

TABLE 8

Comparison of Catalyst Productivity

| Source | Ex. | TON lbs polymer/ lbs catalyst complex | TON-$BF_3$ lbs polymer/ lbs $BF_3$ | Mn Daltons |
|---|---|---|---|---|
| Table 6 | 35 | 1969.70 | 2896.61 | 3118 |
| Table 7 | 46 | 2059.28 | 3028.36 | 3560 |
| Table 4 | 16 | 1003.8 | 1476.1 | 1087 |
| Table 5 | 23 | 784.7 | 1153.9 | 2419 |
| U.S. Pat. No. | | | | |
| 7,038,008 | 1 | 323.04 | 888.07 | 2387 |
| 7,038,008 | 2 | 115.84 | 318.45 | 956 |
| 7,217,773 | comp | 171.72 | 321.21 | 980 |
| 7,217,773 | 1 | 204.6 | 405.06 | 930 |
| 7,485,764 | 1 | 238.48 | 407.52 | 1150 |
| 7,485,764 | 2 | 189.11 | 407.52 | 1070 |
| 7,485,764 | 3 | 157.15 | 407.52 | 1030 |

TABLE 9

Calculation of Catalyst Productivity

| Source | Ex. | Alcohol | $BF_3$ | $BF_3$ wt (lbs) | Alcohol | Alcohol wt (lbs) |
|---|---|---|---|---|---|---|
| Table 6 | 35 | Methanol | | 0.049368 | | 0.023232 |
| Table 7 | 46 | Methanol | | 0.043588 | | 0.020512 |
| Table 4 | 16 | Methanol | | 0.129608 | | 0.060992 |
| Table 5 | 23 | Methanol | | 0.145044 | | 0.068256 |
| U.S. Pat. No. | | | mmoles | (gms) | mmoles | (gms) |
| 7,038,008 | 1 | 2-butanol | 7.1 | 0.48138 | 11.36 | 0.8420032 |
| 7,038,008 | 2 | 2-butanol | 19.8 | 1.34244 | 31.68 | 2.3481216 |
| 7,217,773 | comp | Methanol | 8.55 | 0.57969 | 15.75 | 0.50463 |
| 7,217,773 | 1 | Methanol | 6.78 | 0.459684 | 14.06 | 0.4504824 |
| 7,485,764 | 1 | Methanol | 10 | 0.678 | 15 | 0.4806 |
| 7,485,764 | 2 | Ethanol | 10 | 0.678 | 17 | 0.78302 |
| 7,485,764 | 3 | Isopropanol | 10 | 0.678 | 18 | 1.08018 |

| Source | Ex. | Total Complex wt | Isobutylene flow | Conversion w/w % | PIB lbs/min | TON lbs polymer/ lbs complex |
|---|---|---|---|---|---|---|
| Table 6 | 35 | 0.0726 | | | 143 | 1969.70 |
| Table 7 | 46 | 0.0641 | | | 132 | 2059.28 |
| Table 4 | 16 | 0.1906 | | | 191 | 1003.8 |
| Table 5 | 23 | 0.2133 | | | 167 | 784.7 |
| U.S. Pat. No. | | | | | g/min | |
| 7,038,008 | 1 | 1.3233832 | 450 | 0.95 | 427.5 | 323.04 |
| 7,038,008 | 2 | 3.6905616 | 450 | 0.95 | 427.5 | 115.84 |
| 7,217,773 | comp | 1.0843 | 196 | 0.95 | 186.2 | 171.72 |
| 7,217,773 | 1 | 0.9102 | 196 | 0.95 | 186.2 | 204.6 |
| 7,485,764 | 1 | 1.1586 | 307 | 0.9 | 276.3 | 238.48 |
| 7,485,764 | 2 | 1.46102 | 307 | 0.9 | 276.3 | 189.11 |
| 7,485,764 | 3 | 1.75818 | 307 | 0.9 | 276.3 | 157.15 |

From the foregoing, it will be appreciated that conversion unexpectedly increases with increased recirculation rates at the same residence time, contrary to the teachings of the prior art. Higher yield is realized without significant additional capital or processing costs. It was also found that polydispersity decreases with substantially the same residence time as circulation rates increase all other things being equal. Also with the inventive process, products produced have unexpectedly lower polydispersities especially at higher molecular weight, also contrary to the teachings of the prior art. This feature is particularly desirable when the products are used for making derivatives such as alkyl phenols and/or fuel or lubricating oil additives.

A particularly useful unexpected result is that alpha content does not decrease with increasing conversion when a high velocity system is used to make the product.

ADDITIONAL EMBODIMENTS

The invention is further defined in the appended claims. Still further embodiments of the present invention include: a method of making a polyisobutylene polymer in a recirculating loop reactor with one or more reaction tubes in contact with a heat transfer medium comprising: (a) feeding isobutylene, catalyst and optionally other feed components to a residual reactor stream at a feed rate to form a reaction mixture; (b) recirculating the reaction mixture in the one or more reaction tubes of the loop reactor at a recirculation rate utilizing a recirculating pump operating at a pressure differential, delta P, of from 35 psi to 70 psi; (c) polymerizing the reaction mixture in the one or more tubes of the loop reactor to convert isobutylene to polyisobutylene polymer at a conversion rate expressed in %, w/w, while cooling the one or more tubes of the loop reactor with the heat transfer medium; (d) controlling the recirculation rate, the delta P and polymerization reaction of steps (b) and (c) to provide a recirculation ratio of the recirculation rate to the feed rate of at least 30:1; and (e) withdrawing polyisobutylene polymer from the loop reactor.

In any practice of the present invention, the conversion of isobutylene to polymer is from 50% to 80%, suitably wherein the conversion of isobutylene to polymer is at least 55%, least 60%, at least 65%, at least 70% or at least 75. Likewise in any embodiment, the delta P of the recirculating pump is typically at least 40 psi, suitably at least 45 psi, preferably in some cases the delta P of the recirculating pump is at least 50 psi or at least 55 psi.

The inventive process in any particular application may be operated at a recirculation ratio of from 30:1 to 50:1 such as at a recirculation ratio of at least 35:1, or at least 37.5:1, or at least 40:1 or operated at a recirculation ratio of at least 45:1.

A still further embodiment includes a method of making a polyisobutylene polymer in a recirculating loop reactor with one or more reaction tubes in contact with a heat transfer medium comprising: (a) feeding isobutylene, catalyst and optionally other feed components to a residual reactor stream at a feed rate to form a reaction mixture; (b) recirculating the reaction mixture in the one or more reaction tubes of the loop reactor at a recirculation rate greater than the feed rate utilizing a recirculating pump operating at a at a pressure differential, delta P, of from 35 psi to 70 psi; (c) polymerizing the reaction mixture in the one or more tubes of the loop reactor to convert isobutylene to polyisobutylene polymer at a conversion rate expressed in %, w/w, while cooling the one or more tubes of the loop reactor with the heat transfer medium; (d) controlling the recirculation rate, the delta P and polymerization reaction of steps (b) and (c) to provide a linear velocity of the reaction mixture of at least 11 ft/sec in the one or more tubes of the loop reactor with the proviso that if the conversion of isobutylene is less than 55%, the recirculation rate, the delta P and the polymerization reaction of steps (b) and (c) are controlled to provide a linear velocity of the reaction mixture in the one or more reaction tubes of at least 13.5 ft/sec; and (e) withdrawing polyisobutylene polymer from the loop reactor.

Still yet another embodiment of the present invention includes a method of making a polyisobutylene polymer in a recirculating loop reactor with one or more reaction tubes in contact with a heat transfer medium comprising: (a) feeding isobutylene, catalyst and optionally other feed components to a residual reactor stream at a feed rate to form a reaction mixture; (b) recirculating the reaction mixture in the one or more reaction tubes of the loop reactor at a recirculation rate greater than the feed rate utilizing a recirculating pump operating at a pressure differential, delta P, of from 35 psi to 70 psi; (c) polymerizing the reaction mixture in the one or more tubes of the loop reactor to convert isobutylene to polyisobutylene polymer at a conversion rate expressed in %, w/w, while cooling the one or more tubes of the loop reactor with the heat transfer medium; (d) controlling the recirculation rate, the delta P and polymerization reaction of steps (b) and (c) to provide a linear velocity of the reaction mixture of at least 11 ft/sec in the one or more tubes of the loop reactor with the proviso that if the conversion of isobutylene is less than 55%, the recirculation rate, the delta P and the polymerization reaction of steps (b) and (c) are controlled to provide a linear velocity of the reaction mixture in the one or more reaction tubes of at least 13.5 ft/sec and wherein further, there is provided a recirculation ratio of the recirculation rate to the feed rate of at least 30:1; and (e) withdrawing polyisobutylene polymer from the loop reactor.

In any particular embodiment of the invention, the process may be operated continuously at a residence time of from 1 to 10 minutes, typically operated continuously at a residence time of from 2 to 8 minutes and in many cases preferably operated continuously at a residence time of from 3 to 6 minutes.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A method of making a polyisobutylene polymer in a recirculating loop reactor with one or more reaction tubes in contact with a heat transfer medium comprising:
   (a) feeding isobutylene, catalyst and optionally other feed components to a residual reactor stream at a feed rate to form a reaction mixture;
   (b) recirculating the reaction mixture in the one or more reaction tubes of the loop reactor at a recirculation rate greater than the feed rate utilizing a recirculating pump operating at a pressure differential, delta P, corresponding to a recirculating flow;
   (c) polymerizing the reaction mixture in the one or more tubes of the loop reactor to convert isobutylene to polyisobutylene polymer at a conversion rate expressed in %, w/w, while cooling the one or more tubes of the loop reactor with the heat transfer medium;

(d) controlling the recirculation rate, delta P and polymerization reaction of steps (b) and (c) to provide a linear velocity of the reaction mixture of at least 11 ft/sec in the one or more tubes of the loop reactor with the proviso that if the conversion of isobutylene is less than 55%, the recirculation rate, the delta P and the polymerization reaction of steps (b) and (c) are controlled to provide a linear velocity of the reaction mixture in the one or more reaction tubes of at least 13.5 ft/sec; and (e) withdrawing polyisobutylene polymer from the loop reactor.

2. The method according to claim 1, wherein the delta P and polymerization reaction are controlled to provide a linear velocity of the reaction mixture of from 11 ft/sec to 20 ft/sec in the one or more reaction tubes of the loop reactor.

3. The method according to claim 2, wherein the delta P and polymerization reaction are controlled to provide a linear velocity of the reaction mixture of at least 12 ft/sec in the one or more reaction tubes of the loop reactor.

4. The method according to claim 2, wherein the delta P and polymerization reaction are controlled to provide a linear velocity of the reaction mixture of at least 13 ft/sec in the one or more reaction tubes of the loop reactor.

5. The method according to claim 2, wherein the delta P and polymerization reaction are controlled to provide a linear velocity of the reaction mixture of at least 14 ft/sec in the one or more reaction tubes of the loop reactor.

6. The method according to claim 2, wherein the delta P and polymerization reaction are controlled to provide a linear velocity of the reaction mixture of at least 15 ft/sec in the one or more reaction tubes of the loop reactor.

7. The method according to claim 1, with the further proviso that if the conversion rate of isobutylene is less than 55%, the pressure delta and the polymerization of the reaction mixture in the one or more reaction tubes is at least 14 ft/sec.

8. The method according to claim 1, with the further proviso that if the conversion rate of isobutylene is less than 55%, the delta P and the polymerization of the reaction mixture in the one or more reaction tubes is at least 15 ft/sec.

9. The method according to claim 1, wherein the heat transfer coefficient between the reaction mixture and the heat transfer medium is from 50 BTU/hr ft$^2$° F. to 150 BTU/hr ft$^2$° F.

10. The method according to claim 9, wherein the heat transfer coefficient between the reaction mixture and the heat transfer medium is at least 55 BTU/hr ft$^2$° F.

11. The method according to claim 9, wherein the heat transfer coefficient between the reaction mixture and the heat transfer medium is at least 60 BTU/hr ft$^2$° F.

12. The method according to claim 9, wherein the heat transfer coefficient between the reaction mixture and the heat transfer medium is at least 70 BTU/hr ft$^2$° F.

13. The method according to claim 1, wherein the polyisobutylene withdrawn from the loop reactor is a highly reactive polyisobutylene with a number average molecular weight of from 500 to 4000 Daltons.

14. The method according to claim 13, wherein the loop reactor is operated with a catalyst complex turnover number of from 650 to 1350 lbs. polymer/lbs. catalyst when the polyisobutylene withdrawn from the loop reactor is a highly reactive polyisobutylene with a number average molecular weight of from 1500 to 4000 Daltons.

15. The method according to claim 13, wherein the loop reactor is operated with a catalyst complex turnover number of from 800 to 1500 lbs. polymer/lbs. catalyst complex when the polyisobutylene withdrawn from the loop reactor is a highly reactive polyisobutylene with a number average molecular weight of from 500 to 1500 Daltons.

16. The method according to claim 15, wherein the loop reactor is operated with a catalyst complex turnover number of at least 900 lbs. polymer/lbs. catalyst complex.

17. The method according to claim 1, wherein the polymer withdrawn from the loop reactor is a mid-range vinylidene polyisobutylene polymer with a number average molecular weight of from 500 Daltons to 4000 Daltons.

18. The method according to claim 17, wherein the loop reactor is operated with a catalyst complex turnover number of from 1600 lbs. polymer/lbs. catalyst complex to 3000 lbs. polymer/lbs. catalyst complex.

19. The method according to claim 17, wherein the loop reactor is operated with a catalyst complex turnover number of at least 1800 lbs. polymer/lbs. catalyst.

20. The method according to claim 1, wherein the loop reactor has a plurality of reaction tubes.

* * * * *